US011574320B1

(12) United States Patent
Lipton et al.

(10) Patent No.: US 11,574,320 B1
(45) Date of Patent: Feb. 7, 2023

(54) TOKENIZING SCARCE GOODS WITH PROVENANCE HISTORY BOUND TO BIOLOGICAL FINGERPRINTS

(71) Applicant: Numéraire Financial, Inc., Chicago, IL (US)

(72) Inventors: Alexander Lipton, Chicago, IL (US); Thomas P. Hardjono, Winchester, MA (US)

(73) Assignee: NUMÉRAIRE FINANCIAL, INC., Chicago, IL (US)

( * ) Notice: Subject to any disclaimer, the term of this patent is extended or adjusted under 35 U.S.C. 154(b) by 0 days.

(21) Appl. No.: 17/689,751

(22) Filed: Mar. 8, 2022

Related U.S. Application Data

(60) Provisional application No. 63/272,104, filed on Oct. 26, 2021.

(51) Int. Cl.
*G06Q 30/00* (2012.01)
*H04L 9/32* (2006.01)

(52) U.S. Cl.
CPC ....... *G06Q 30/0185* (2013.01); *H04L 9/3263* (2013.01)

(58) Field of Classification Search
CPC .......................... G06Q 30/0185; H04L 9/3263
USPC ......................................................... 705/318
See application file for complete search history.

(56) References Cited

U.S. PATENT DOCUMENTS

| | | | | |
|---|---|---|---|---|
| 5,139,812 | A * | 8/1992 | Lebacq | B82Y 10/00 427/337 |
| 9,919,512 | B2 * | 3/2018 | Jung | B41F 17/00 |
| 2018/0357365 | A1 * | 12/2018 | Meadow | C12Q 1/6813 |

(Continued)

FOREIGN PATENT DOCUMENTS

| | | | |
|---|---|---|---|
| EP | 3996323 A1 * | 5/2022 | |
| WO | WO-2021024023 A1 * | 2/2021 | ............. G06F 21/30 |

OTHER PUBLICATIONS

"Chanel Bags Switch from Serial Stickers to Microchips in 2021", downloaded from https://madisonavenuecouture.com/blogs/news/chanel-bags-switch-from-serial-stickers-to-microchips-in-2021 dated 2021 and attached as a PDF file (Year: 2021).*
"Entrupy_Expands_Its_Reach_to_Combat_Counterfeit_Goods", dated 2019, downloaded from Entrupy Expands Its Reach to Combat Counterfeit Goods | California Apparel News and attached as a PDF. file. (Year: 2019).*

(Continued)

*Primary Examiner* — James D Nigh
(74) *Attorney, Agent, or Firm* — Nicholson De Vos Webster & Elliott LLP

(57) ABSTRACT

Techniques for enabling the creation of a digital asset representation of physical goods (e.g., luxury items) produced in limited quantities or heirloom-goods associated with restricted ownership rules. Anti-counterfeiting mechanisms are proposed for both classes of goods. The provenance of both classes of goods is traced using cryptography and decentralized ledger technology. For example, mechanisms to restrict ownership of heirloom-goods are proposed based on the combination of the DNA biological fingerprint of the patron who originated the goods and smart contract technology. The goods can be represented as digital tokens on the blockchain, binding manufacturing evidence to the token. For heirloom-goods that have restricted ownership rules, persons seeking to acquire the good via the digital token and smart contract are required to prove that they satisfy the entitlement rules based on a biological relationship to the patron.

20 Claims, 16 Drawing Sheets

(56) References Cited

U.S. PATENT DOCUMENTS

2022/0122276 A1* 4/2022 Karam .................... G06T 7/529

OTHER PUBLICATIONS

"Chanel Bags Switch from Serial Stickers to Microchips in 2021", downloaded from https://madisonavenuecouture.com/blogs/news/chanel-bags-switch-from-serial-stickers-to-microchips-in-2021 dated 2021 (Year: 2021).*

"Entrupy_Expands_Its_Reach_to_Combat_Counterfeit_Goods", dated 2019 (Year: 2019).*

* cited by examiner

OPERATIONS
1300

```
OBTAINING, BY A DIGITAL ASSET PROVIDER, (I) A DIGITAL
ASSET DEFINITION (DAD) FILE INCLUDING INFORMATION
UNIQUELY IDENTIFYING A PHYSICAL PRODUCT INSTANCE
AND (II) A DIGITAL CERTIFICATE UNIQUELY IDENTIFYING A
MANUFACTURER OF THE PHYSICAL PRODUCT INSTANCE
1302
```

↓

```
GENERATING A DIGITAL ASSET TOKEN BASED ON THE DAD
FILE AND THE DIGITAL CERTIFICATE 1304
```

↓

```
STORING THE DIGITAL ASSET TOKEN USING
DECENTRALIZED LEDGER TECHNOLOGY 1306
```

*FIG. 13*

OPERATIONS 1400 

OBTAINING, BY A DIGITAL ASSET PROVIDER, (I) A DIGITAL ASSET DEFINITION (DAD) FILE INCLUDING INFORMATION UNIQUELY IDENTIFYING A PHYSICAL PRODUCT INSTANCE, AND (II) A DIGITAL CERTIFICATE UNIQUELY IDENTIFYING A MANUFACTURER OF THE PHYSICAL PRODUCT INSTANCE, WHEREIN THE DIGITAL CERTIFICATE INCLUDES DEOXYRIBONUCLEIC ACID (DNA) DATA OBTAINED FROM A DNA DATA AUTHORITY, WHEREIN THE DNA DATA UNIQUELY IDENTIFIES A PERSON ASSOCIATED WITH THE PHYSICAL PRODUCT INSTANCE 1402

GENERATING A DIGITAL ASSET TOKEN BASED ON THE DAD FILE AND THE DIGITAL CERTIFICATE 1404

STORING THE DIGITAL ASSET TOKEN USING DECENTRALIZED LEDGER TECHNOLOGY 1406

FIG. 14

TOKENIZING SCARCE GOODS WITH PROVENANCE HISTORY BOUND TO BIOLOGICAL FINGERPRINTS

CROSS-REFERENCE TO RELATED APPLICATION

This application claims the benefit of U.S. Provisional Application No. 63/272,104, filed Oct. 26, 2021, which is hereby incorporated by reference.

BACKGROUND

Distributed ledger technology refers broadly to the infrastructure and protocols used to provide distributed ledgers. Distributed ledgers represent a consensus of replicated, shared, and synchronized data that is stored across different sites and geographies by multiple participants. In contrast to centralized ledgers or databases, distributed ledgers generally are not associated with any central authority and updates made to the ledger are reflected and copied to all participants using a consensus algorithm. The security of distributed ledgers is achieved in part using cryptographic keys and digital signatures.

BRIEF DESCRIPTION OF DRAWINGS

Various examples in accordance with the present disclosure will be described with reference to the drawings, in which:

FIG. 13 is a flow diagram illustrating operations of a method for tokenizing a luxury-grade product instance and storing a tokenized representation of a luxury-grade product instance using decentralized ledger technology according to some examples.

FIG. 14 is a flow diagram illustrating operations of a method for tokenizing an heirloom-grade product instance and storing a tokenized representation of an heirloom-grade product instance using decentralized ledger technology according to some examples.

DETAILED DESCRIPTION

Figure 1:
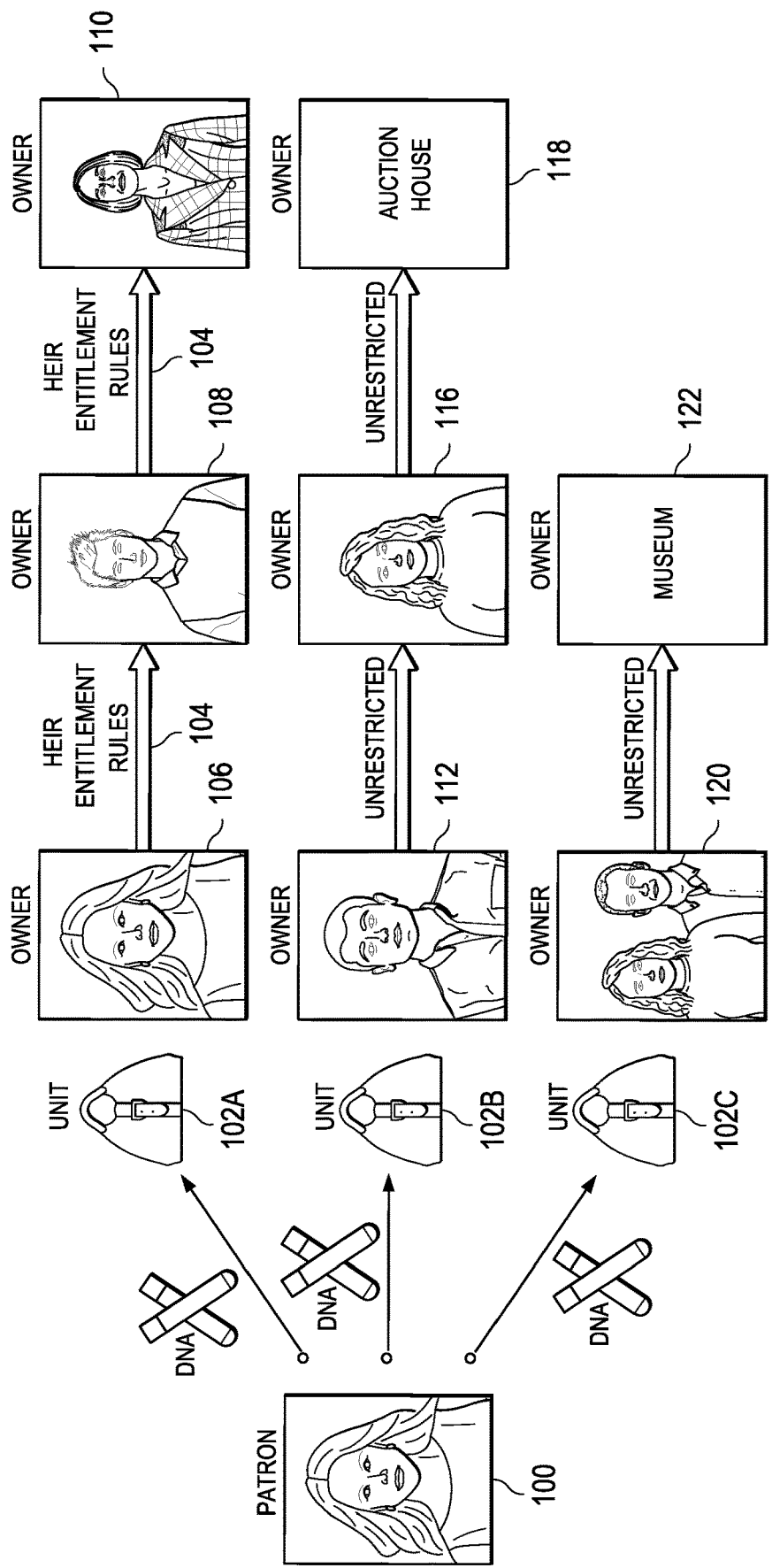
FIG. 1 is a diagram illustrating an overview of the use of deoxyribonucleic acid (DNA) to trace the provenance of heirloom-grade products according to some examples.

The present disclosure relates to methods, apparatus, systems, and non-transitory computer-readable storage media for enabling the creation of a digital asset representation of physical goods (e.g., luxury items) produced in limited quantities or heirloom-grade goods associated with restricted ownership rules. According to examples, anti-counterfeiting mechanisms are proposed for both classes of goods. In some examples, the provenance of both classes of goods is traced using cryptography and decentralized ledger technology. For example, mechanisms to restrict ownership of heirloom-grade goods are proposed based on a combination of (i) a deoxyribonucleic acid (DNA)-based biological fingerprint of a patron who originated the goods, and (ii) smart contract technology. The goods can be represented as digital tokens on a blockchain, including the binding of manufacturing evidence associated with a good to a corresponding token. For heirloom-grade goods that are associated with restricted ownership rules, in some examples, persons seeking to acquire an heirloom-grade good via the digital token and smart contract are required to prove that they satisfy the entitlement rules based on a biological relationship to the patron.

Today, there is an interest in many industries for the ability to represent scarce physical goods (e.g., luxury items) in the form of a digital asset that can be represented as a non-fungible token (or "NFT") within blockchain networks deployed using decentralized ledger technology (or "DLT"). Examples described herein provide mechanisms for managing such representations of scarce luxury-grade products (or "LGPs"), as well as for a more constrained case of heirloom-grade products (or "HGPs"). In this context, an heirloom-grade product can be considered a luxury-grade product but with the additional feature in that they are associated with biological evidence of the person or patron who commissioned the product as well as there being additional rules as to which persons are permitted to acquire the goods (assuming other possible conditions are met, e.g., financial payment for the goods).

In some examples, both of these types of goods (e.g., luxury-grade products and heirloom-grade products) can be associated with digital asset tokens and smart contracts, and these digital representations of the products can be traded on blockchain-based asset trading networks (or "ASNs"). Among other benefits, this permits these types of physical goods to be held in safe keeping (e.g., in a vault in a depository), while their ownership can change hands via transactions on the ASN blockchain.

1.1. Luxury-Grade Products

As used herein, luxury-grade products include scarce "finished" products (e.g., in contrast to scarce natural resources) in that the products attain economic value due to the finished state of the product in limited quantities. Luxury-grade products thus represent end products intended to be acquired by persons and, as such, are different from scarce natural resources, which are intended to be further processed (e.g., an amount of rare earth metals such as platinum). In some examples, a luxury-grade good product as described herein can generally include any finished product that is: (a) fixed in quantity, and (b) is not produced again at a later time (or that is otherwise part of a self-restricting set of product instances). In contrast, rare natural resources may have continuous supplies albeit at small rates of production.

One non-limiting example of luxury-grade products are designer goods produced in one season of the year (e.g., designer handbags, shoes, furniture, prints, cars, etc.). These types of products, for example, are often limited in quantity by design (e.g., only 100 units of a handbag are ever created) and are recognizable by the brand associated with them. In some cases, a luxury-grade product has utility in the hands of its owner (e.g., a handbag can be used to carry items, or a watch can be worn and used to keep time, or a limited-edition sports car can be driven by its owner).

The desire to treat luxury-grade products as NFTs arises in part from the existence of a market (e.g., a primary and a secondary market) for these branded goods and, therefore, the desire to consider these types of goods as true assets. The digitization of such goods into NFTs permits their digitized representation to be tradeable on decentralized trading platforms (e.g., blockchain networks).

One challenge with scarce luxury-grade products relates to preventing the counterfeiting of such products, which introduces a degree of ambiguity and confusion among potential buyers, particularly in the secondary market. The potential existence of counterfeit goods can impact not only the specific brand in question but also can negatively affect the market as a whole. In some examples, the tokenization of these types of goods in the manner described herein can aid in the detection of such counterfeiting.

1.2. Heirloom-Grade Products

In some examples, a physical item can be considered to be an heirloom-grade product (or "HGP") when there is an indisputable provenance history of the item from its original manufacturer down to the current owner. In some cases, an heirloom-grade product can have restrictions or constraints regarding the person(s) who may acquire the product based on biological relationship rules defined by the patron. Heirloom-grade products that are associated with biological relationship rules can be referred to as restricted heirloom-grade products, whereas heirloom-grade products without limits to ownership can be referred to as unrestricted heirloom-grade products.

An heirloom-grade product carries DNA evidence of its original owner (also referred to as the "patron"). The product instance thus can be considered a luxury-grade product that was subsequently enhanced with the DNA evidence of the patron, or it may be a custom order item tailored for the patron and that incorporates the DNA evidence of the patron. Although examples described herein include the use of DNA evidence to enforce transferability rules for product instances, in other examples, other types of conditions can be specified such as, e.g., geographic based rules (e.g., to ensure that an heirloom-grade product instance stays within certain geographic boundaries), organizational-based rules (e.g., to ensure that an heirloom-grade product instance stays within the membership of a certain organization such as a business entity, academic institution, religious institution, etc.), or other types of rules that can be codified into a smart contract.

FIG. 1 is a diagram illustrating an overview of the use of DNA to trace the provenance of heirloom-grade products according to some examples. In the example of FIG. 1, a patron 100 purchased three (3) units 102A, 102B, and 102C, out of several (e.g., twenty (20)) units of a luxury-grade product (e.g., a handbag) produced in total. The patron 100 further bound her DNA with each of the physical units 102A, 102B, and 102C, thereby creating heirloom-grade products. For one of the heirloom-grade products (e.g., the unit 102A), the patron 100 created heir entitlement rules 104 (or "HER") that permit the unit 102A of the item to be legally owned only by a descendant of the patron 100 (e.g., subsequent owners 106, 108, and 110). Thus, the unit 102A represents a restricted heirloom-grade product instance.

In FIG. 1, the other two units (e.g., unit 102B and unit 102C) are not associated with heir entitlement rules and, as such, can be owned by any other person. These two units thus represent unrestricted heirloom-grade product items. Thus, in one case (e.g., unit 102B), the unit was formerly owned by owners 112 and 114 and is currently legally owned by an auction house (owner 118), where the auction house intends to sell the unit 102B to a highest bidder. In another case (e.g., unit 102C), the current legal owner of the unit (subsequent to an owner 120) is a museum (owner 122) and thus likely does not intend to ever sell the item.

In each of these three instances (e.g., in the case of unit 102A, 102B, and 102C), a separate digital asset token (or "DAT") is created on a blockchain for the purpose of tracing the provenance of owners and for enforcing any associated heir entitlement rules (e.g., in the case of unit 102A). For example, the token corresponding to unit 102A can include heir entitlement rules embedded in a digital asset contract (or "DAC") and that require any entity desiring to acquire the unit to prove biological relationship to the patron, as described herein.

In some examples, the combination of the patron DNA evidence, the digital asset tokens on the blockchain, and the history of the ownership of the digital asset tokens provide provenance data for each of the three instances of the heirloom-grade product. Together with the anti-counterfeiting mechanism employed for the series of the item produced (e.g., the total of 20 units produced, three of which carry the patron's DNA), the provenance data permits buyers to distinguish between the unique three (3) unit instances that are true heirloom-grade products relative to the remaining seventeen (17) unit instances that are more simply luxury-grade products items.

In some examples, a patron has the freedom to also adopt heirs or other descendants. This means, similar to biological descendants, the adoptee can provide their biological fingerprint, which is then incorporated into the heir entitlement rules devised by the patron.

1.3 Summary of Heirloom-Grade Products

In some examples, an heirloom-grade product is associated with the following properties: (a) the product is a scarce, luxury-grade product (possibly with additional custom-made features for the initial owner or patron); (b) the product is bound (physically, digitally, or both) to the unique DNA biological fingerprint of the patron of the item; and (c) its future ownership rules may be determined by ownership rules defined by its patron who commissioned the bespoke product. A product optionally can be physically bound with the unique DNA of the patron by affixing evidence of the patron's DNA to the product (e.g., by enclosing a small amount of hair, blood, or the like, in a container attached to or otherwise made part the product). By including a patron's DNA evidence with the product, an identifying genome sequence of a patron can be obtained years in the future, e.g., in cases where a DNA data authority used to generate an initial DNA data authority certificate (described in more detail hereinafter) may no longer exist or in other similar scenarios where verification of the patron's DNA evidence is useful.

More formally, the notion of an heirloom-grade product is applicable to scarce finished products in that they are available only to persons whose unique biological fingerprint is provably related to the patron as the initial owner of the goods on some heir ownership policies (or "HOP") pertaining to the goods or items. In some embodiments, the heir ownership policies can be expressed in the form of a contractual document or other textual description of a patron's desires for an heirloom-grade product instance.

A manufacturer may produce heirloom-grade products based on a commissioned/bespoke order from a patron customer. A patron customer who orders an heirloom-grade product is referred to as an heirloom product patron (or "HPP"). Note that the patron may order several instances of an heirloom-grade product (e.g., order three separate handbags), some of which may be initially owned by the patron and then bequeathed to blood-relatives (e.g., given to the patron's children).

In some embodiments, a patron determines the heir entitlement rules for one or more (or all) of the instances of an heirloom-grade product. If several instances of the same heirloom-grade product are made, then the patron can designate either (i) all of the instances to share the same heir entitlement rules, or (ii) some having their own heir entitlement rules, or (iii) some having no heir entitlement rules (e.g., so that they are unrestricted). In any case, the DNA of the patron is bound to the items regardless of their associated heir entitlement rules.

In some examples, the heir entitlement rules for an heirloom-grade product instance can contain clauses that specify the rules expiration time in the future (e.g., a set of rules can be set to expire fifty (50) years from first registration on a blockchain), at which point the product instance's heir entitlement rules become legally ineffective and the product resembles more of a luxury-grade product.

It is noted that more than one patron can have their biological fingerprint bound to an heirloom-grade product. For example, a husband and a wife can create an heirloom-grade product instance that permits descendant family members on both the husband-side and the wife-side to be claimants in the future. Regardless of the number of patrons, the heir entitlement rules are to be created such the rule is internally consistent.

Similar to luxury-grade products, an heirloom-grade product can be associated with counterfeit-detection capabilities. In manufacturing terms, an heirloom-grade product commissioned by a patron employs the same technological anti-counterfeiting solutions as unrestricted luxury-grade products.

Similar to luxury-grade products, a given heirloom-grade product is tokenized into NFTs by way of creating a digital asset token (or "DAT") that is tradeable on a blockchain-based asset trading network. However, in the case of an heirloom-grade product, the digital asset token is cryptographically bound to the digital asset contract (or "DAC") that accompanies the digital asset token on the blockchain. The digital asset contract is a smart contract that implements the heir entitlement rules. Thus, in some examples, the digital asset contract is invoked as a condition prior to any trade transaction involving the digital asset token corresponding to an heirloom-grade product instance. The smart contract, for example, ensures that the heir entitlement rules are enforced on the asset-trading network (e.g., blockchain), constraining its ownership based on the conditions specified in the heir entitlement rules determined by the commissioning patron. A smart contract, for example, can include executable code stored on a blockchain that runs when certain conditions are met (e.g., a transaction involving a product is initiated). A smart contract can be used, for example, to codify the terms of an agreement between a buyer and a seller in the form of code, where the code and the terms of the agreement encoded therein can be stored using decentralized ledger technology. In examples described herein, these smart contracts can be used to codify heir entitlement rules and other conditions specified as part of transactions between persons involving luxury-grade and heirloom-grade product instances.

2.0. Example Terminology

In some examples, a goods classification refers to the family of goods within which an item belongs (e.g., luxury handbags; luxury shoes; limited-edition sportscars, etc.).

In some examples, a brand owner is an entity that legally owns the brand associated with a luxury item.

In some examples, a goods manufacturer is an entity responsible for creating the physical goods belonging to a brand owner. In some cases, a goods manufacturer and a brand owner can be the same entity.

In some examples, an heirloom-grade product patron, or simply patron, is a person or persons who purchases one or more instances of an heirloom-grade product, either based on a bespoke order or based on a limited-run from the manufacturer.

In some examples, a product can be considered an heirloom-grade product if it possesses the following attributes: (a) it is a scarce finished product (where the product may possibly be custom-made for a patron); (b) it is bound (physically, digitally, or both) to the unique biological fingerprint of the patron of the item; and (c) its ownership state may be constrained by some policies by its patron.

In some examples, a restricted heirloom-grade product item is one which is associated with future ownership restrictions or constraints defined by its patron, typically based on some biological relationship aspects to the patron.

In some examples, heir entitlement rules are a set of rules defined by a patron of a restricted heirloom-grade product item.

In some examples, heir ownership policies are a set of legal constraints for a restricted heirloom-grade product item created by a legal representative of the associated patron based on the heir entitlement rules for that item (e.g., heir ownership policies might typically be written as a legal contract). The heir ownership policies can be implemented in a corresponding smart contract governing the purchase of the corresponding digital asset token (e.g., the digital asset token representing the restricted heirloom-grade product) on the blockchain.

In some examples, a legal representative of the patron is a legal representative who creates living wills of deceased persons.

In some examples, item physical fingerprinting or item material fingerprinting is an extraction process for unique physical properties of a product item that allows for a globally unique digital identifier to be established under the control of the brand issuer.

In some examples, a patron biological fingerprint includes biological traits of a person (e.g., the patron) that uniquely identifies the person relative to other humans ever born (and to be born). This can typically include the genomic sequence from a person's DNA that is unique to that human person.

In some examples, a DNA data authority is an entity who is legally authoritative in performing genomic sequencing from the DNA of a human subject (e.g., patrons).

In some examples, a DNA data authority certificate for a patron is a data structure (e.g., a file) that carries the cryptographic one-way hash of the unique genomic sequence data of a patron. Not that for privacy reasons, a certificate may not hold the actual complete genome sequence file but only a hash of it instead. In some examples, a DNA data authority certificate is issued by a DNA data authority and digitally signed by the DNA data authority.

In some examples, a relationship distance measurement to a patron is a DNA-based numerical representation of the relationship between a person and a patron. As an example, the relationship distance measurement can be the shared centimorgans (cMs) of a person with the patron.

In some examples, a patron biological relationship certificate is a report explaining the biological relationship between a person and the patron, based on the genomic sequencing of that person's DNA. It includes some unit measurement distance of this relationship with the patron (e.g., includes the relationship distance measurement value).

In some examples, a blinded patron biological relationship is an anonymized patron biological relationship report where the identity of the person is blinded or hidden (e.g., substituted with a random string) but still carries the relationship distance measurement value (e.g., relative to the patron) for that person.

In some examples, an item material fingerprint includes the material properties of a product instance that can uniquely identify the item from among similarly constructed instances of the same item type. For example, for a leather-based product, the item material fingerprint can be the microscopic scan of several different locations of the leather surface (e.g., several high-resolution scans resulting in several files that together can identify the item).

In some examples, an item material fingerprint certificate is a digital certificate in a standard format (e.g., X.509).

In some examples, a manufacturer product provenance certificate is a certificate issued by the manufacturer and which combines, among other data, (a) an item material fingerprint certificate; (b) a DNA data authority certificate; and (c) other secret parameters.

In some examples, an authorized agent of the manufacturer is a dealer or shop located remotely (e.g., in a different legal jurisdiction) who is in possession of a copy of the brand manufacturer public key.

In some examples, a brand manufacturer public key-pair is the private-public key pair of the manufacturer that is associated with a luxury-grade product or heirloom-grade product. In the case of a luxury-grade product, the key-pair may be associated with the line of products in a given class/family.

In some examples, a brand line public key-pair is a private-public key pair of the manufacturer that is associated with a limited line or series of luxury-grade products.

In some examples, a manufacturer instance key-pair is a private-public key-pair that is unique for a product. the key-pair can be kept private/secure by the manufacturer.

In some examples, a brand distribution point is a physical retail store or outlet certified by the brand owner for the sale, verification, and re-sale of physical items issued by the brand owner.

In some examples, a fingerprint file is a data file resulting from the digital microscope scan of a specific physical location of the item that is unique to the item.

3.0. Material Fingerprinting for Luxury-Grade Products

In some examples, it is desirable to prevent counterfeiting of luxury-grade products (and heirloom-grade products). For example, mechanisms to detect or prevent counterfeiting ensures that buyers of luxury-grade products can retain the value associated with the brand of the product. In these examples, for simplicity, no distinction is made between the manufacturer and the brand, and it is assumed that the legal brands owner also owns the factories which manufacture the goods; in other examples, these may be separate entities.

In some examples, in order to detect and prevent (or limit) counterfeit goods sold in the market associated with a given brand (thereby harming the brand market value), the manufacturer of a product item performs the material fingerprinting of each physical product instance as part of the product manufacturing process. Any of several fingerprinting technologies can be used, such as spraying chemicals that are unique to the manufacturer (e.g., where the chemical makeup is a secret formula), adding nanoparticles and nanocrystals to the surface of the item, etc.

3.1. Material Fingerprinting Process

Figure 2:
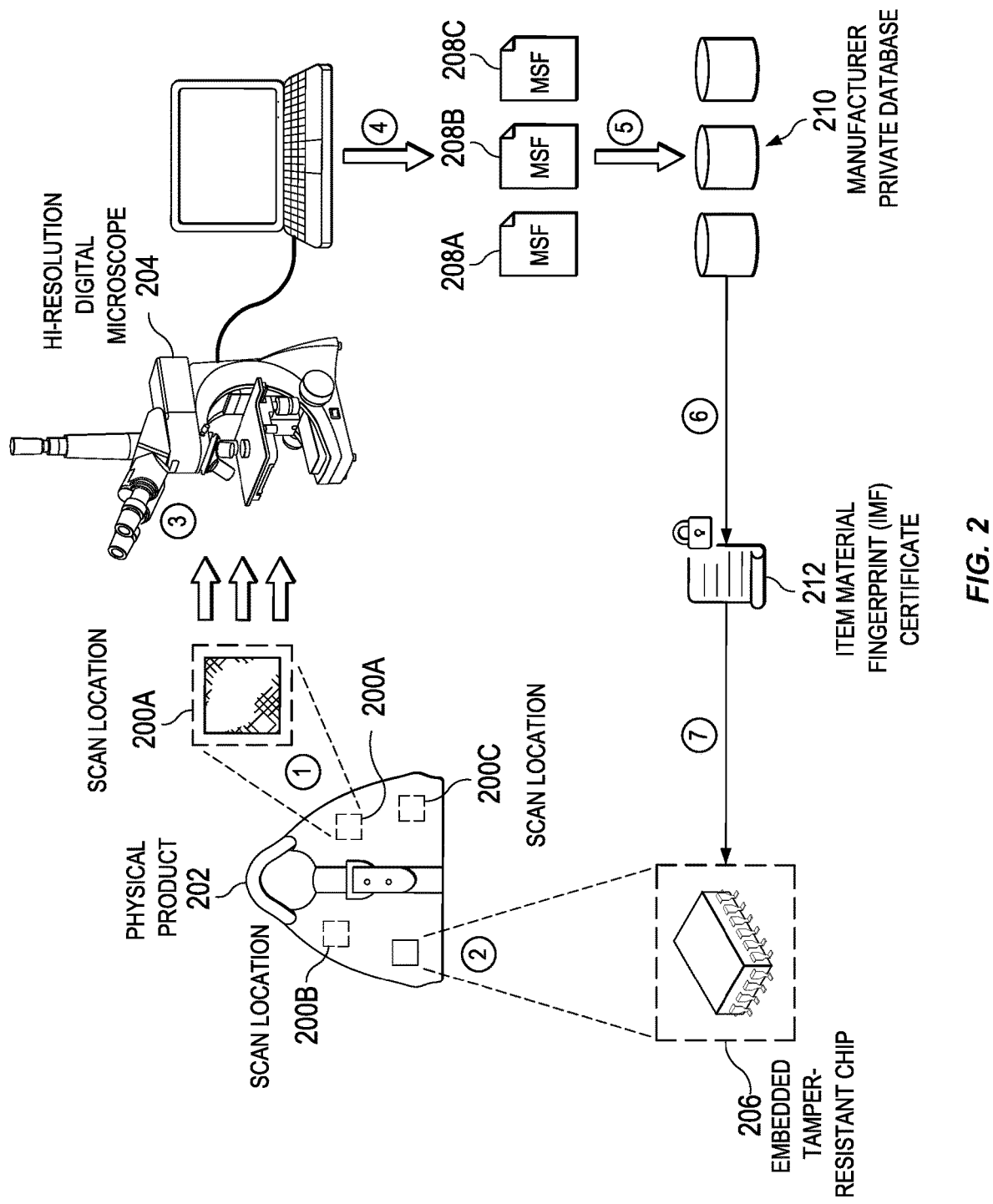
FIG. 2 illustrates an example process for creating a material fingerprint for luxury-grade products according to some examples.

FIG. 2 is a diagram illustrating the creation of a material fingerprint for luxury-grade products according to some examples. In some examples, at circle "1," for a given item category, a manufacturer selects several scan areas or locations (e.g., scan location 200A, scan location 200B, and scan location 200C) that permit the unique physical surface characteristics of a physical product 202 to be digitally scanned (e.g., by a high-resolution digital microscope 204).

In some examples, at circle "2," the manufacturer embeds a tamper-resistant hardware microprocessor or chip 206 within the physical goods. The hardware microprocessor 206 is used to securely store unique identifier numbers and cryptographic keys/parameters associated with the physical item. For example, the electronic board containing the hardware microprocessor 206 may be manufactured to be ultra-thin (e.g., possibly double or triple the thickness of a human hair). This kind of microprocessor technology can be laid within the lining of certain types of luxury products (e.g., handbags, watches, etc.).

In some examples, at circle "3," the manufacturer then performs the scanning of the selected areas (e.g., of the item surface) in order to obtain digital images of the unique characteristics of the item 202. Several scan locations of the item can be utilized for each item category. For example, in the case of a designer leather handbag, the manufacturer may select a standardized set of locations (e.g., three 1-inch by 1-inch locations in the example of FIG. 2) within the inner leather or inner lining material. Because each leather surface will have distinct natural surface characteristics, each of the resulting scans of the specified areas of the same handbag can be associated with a unique representative byte-sequence of data.

In some examples, at circle "4," for each scan location of the physical item 202, the digital microscope 204 or other device yields a file containing a high-resolution image of the location (e.g., a 1-inch×1-inch square image of the bottom of a bag). These are referred to herein as microscopic scan files (or "MSFs") (e.g., MSF 208A, MSF 208B, and MSF 208C). As indicated, for each product instance, several microscopic scan files can be created for each of the scan locations.

In some examples, at circle "5," the manufacturer securely stores the microscopic scan files of each product instance within its private database 210.

In some examples, at circle "6," using parts of the microscopic scan files of a given product item, the manufacturer uses a computing device to generate a unique digital certificate referred to as the item material fingerprint certificate 212. The manufacturer digitally signs this certificate using its private key.

In some examples, at circle "7," the manufacturer securely stores a copy of the item material fingerprint certificate 210 within the tamper-resistant hardware microprocessor 206 that is bound physically to the item. This permits authorized entities to read the certificate from the hardware microprocessor 206 as part of evaluating the provenance of the item 200.

3.2. Product Instance Material Fingerprint Certificate

Figure 3:
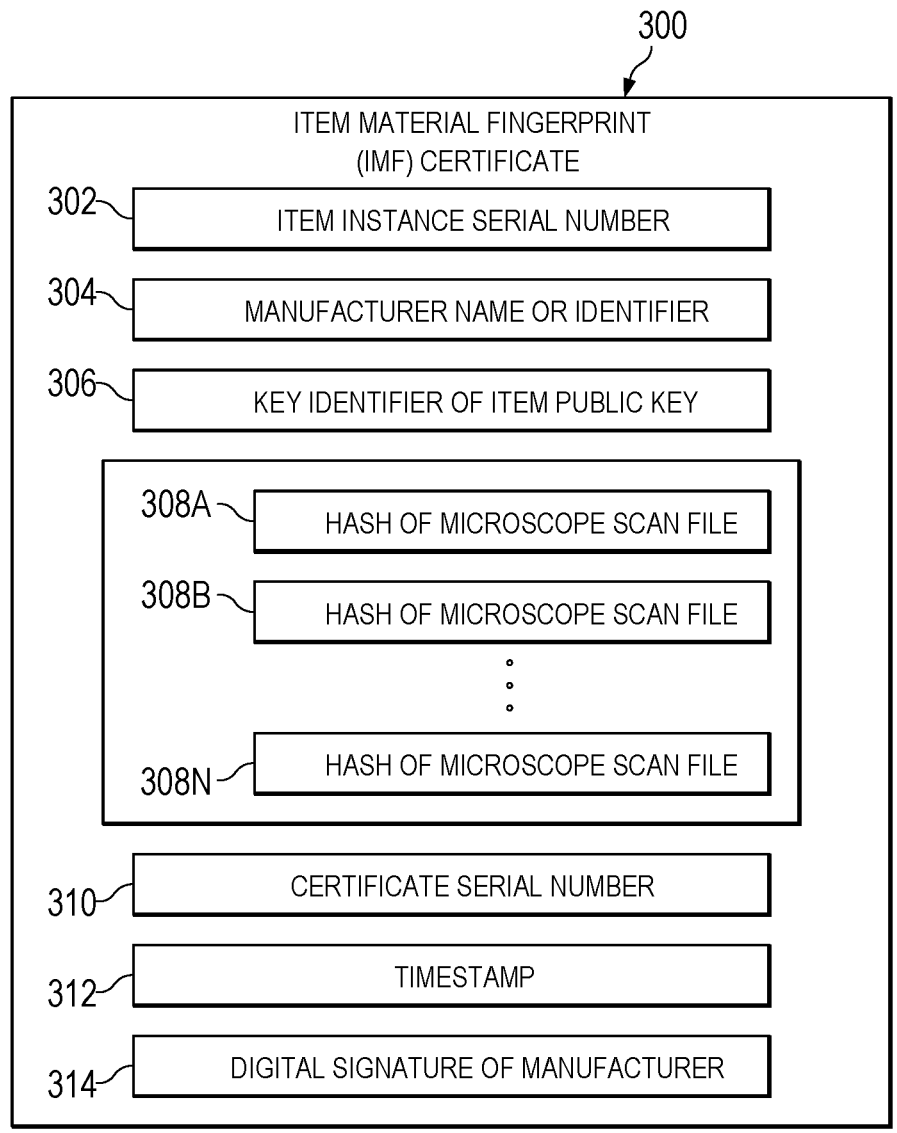
FIG. 3 illustrates an example format of an item material fingerprint (or "IMF") certificate according to some examples.

In some examples, for each item/product instance, the manufacturer derives an item material fingerprint certificate that is associated with the item. FIG. 3 illustrates an example of an item material fingerprint certificate 300 according to some examples. In some examples, a copy of the item material fingerprint certificate 300 is placed inside the tamper-resistant hardware microprocessor that is physically attached to the item. In some examples, an item material fingerprint certificate 300 includes an item instance serial number 302, a manufacturer name or identifier 304, a key identifier of a public key 306 assigned to the item, one or more hash values derived from microscope scan files (e.g., hash of microscope scan file 308A, hash of microscope scan file 308B, . . . , hash of microscope scan file 308N), a certificate serial number 310 (of the IMF certificate), a timestamp 312 (indicating a creation date of the certificate), and a digital signature of the manufacturer 314. Other examples can include more, fewer, or different data items.

As indicated, in some examples, the certificate 300 includes only a key identifier 306 (or "KeyID") of the public key that has been assigned to the item (i.e., the certificate does not include the actual public key itself). In some examples, the public/private key pair associated with the item is stored inside the tamper-resistant hardware microprocessor that has the ability to employ the key pair for certain types of actions.

3.3. Family of Keys Inside the Hardware Microprocessor

Figure 4:
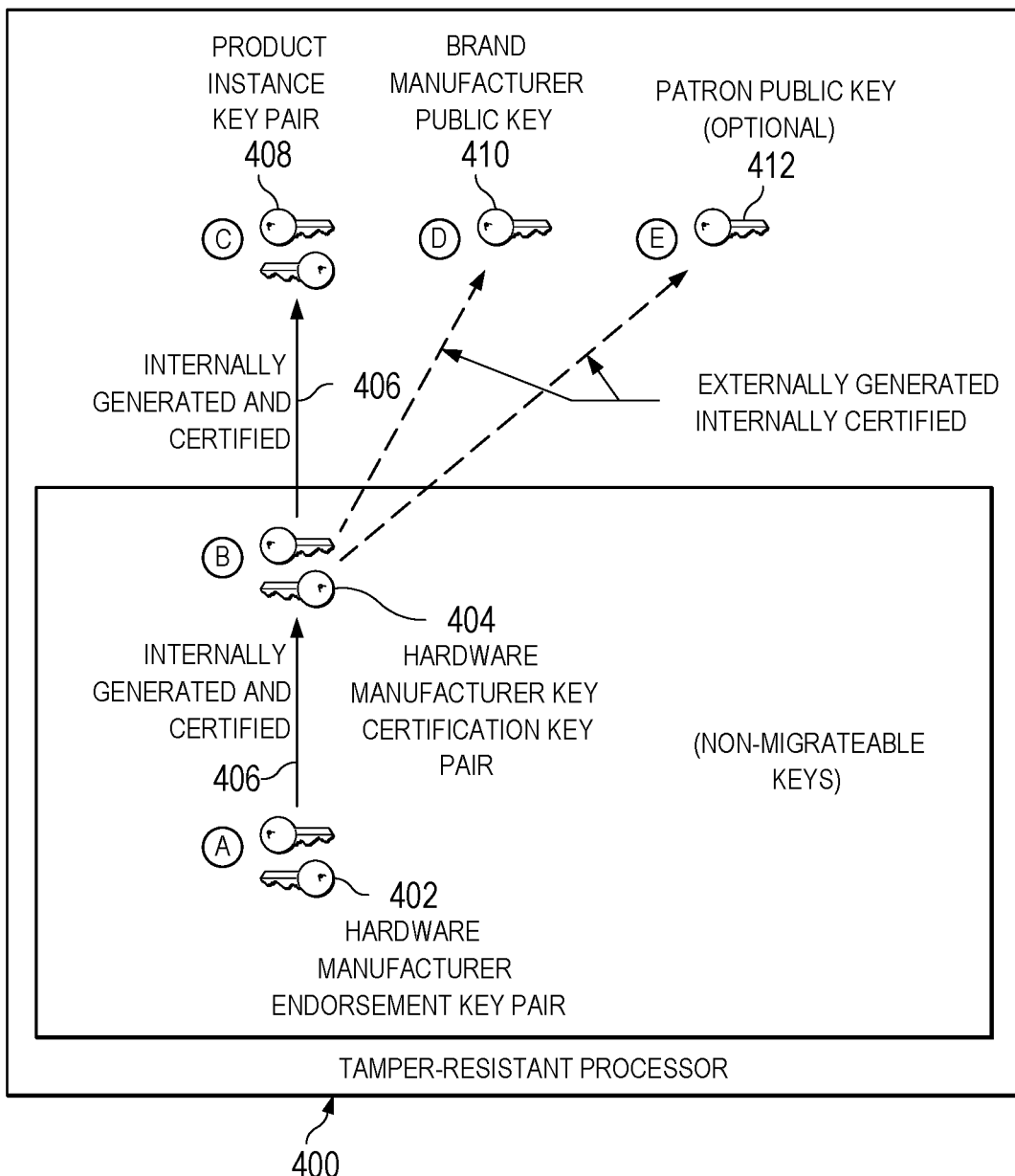
FIG. 4 illustrates an example overview of a key hierarchy inside a tamper-resistant hardware microprocessor according to some examples.

In some examples, for each product item instance, several keys are held and operated by a tamper-resistant hardware processor coupled to the item instance. FIG. 4 illustrates an example overview of a key hierarchy inside a tamper-resistant hardware microprocessor 400 according to some examples. As shown, the keys including some or all of:

(a) a device-identity public/private key pair for the microprocessor (or hardware manufacturer endorsement key pair 402): In some examples, this is the public/private key pair that is unique for the instance of the microprocessor that is attached to the physical item. This key pair cannot be read or migrated to a different microprocessor and can only be operated upon indirectly through certain commands that can be issued by an authorized entity (e.g., a luxury-grade product manufacturer).

(b) an internal certificate public/private key pair (or hardware manufacturer key certification key pair 404): In some examples, this is an internally generated and certified 406 public/private key pair that is used to prove the cryptographic binding of other keys that are used to interact with the world outside of the microprocessor. This key pair is not migratable and only the public key is readable by external entities.

(c) a product instance public/private key pair 408: In some examples, this is the unique public/private key pair that is associated with (e.g., belongs to) to a particular product instance. This key pair permits the hardware microprocessor to respond to authorized challenge messages from approved entities (e.g., authorized dealers of a luxury-grade product brand). In some examples, the product instance public key is certified by the internal certificate key pair by way of the product instance public key being wrapped in a simple certificate data structure that is signed by the internal certification private key.

(d) a brand manufacturer public key 410: this is the public key of the luxury-good product manufacturer. It is imported into the hardware microprocessor and then certified by the internal certification key pair by way of the brand manufacturer public key being wrapped in a simple certificate data structure that is signed by the internal certification private key.

(e) a patron public key (optional) 412: in cases where the product instance is an heirloom-grade product commissioned by a patron, in some examples, the patron's public key is imported into the hardware microprocessor. In some examples, this key can be used to prove the cryptographic binding of the physical product instance to the patron. The patron's public key is certified by the internal certification key pair.

4.0. Tokenization of Luxury-Grade Products

Figure 5:
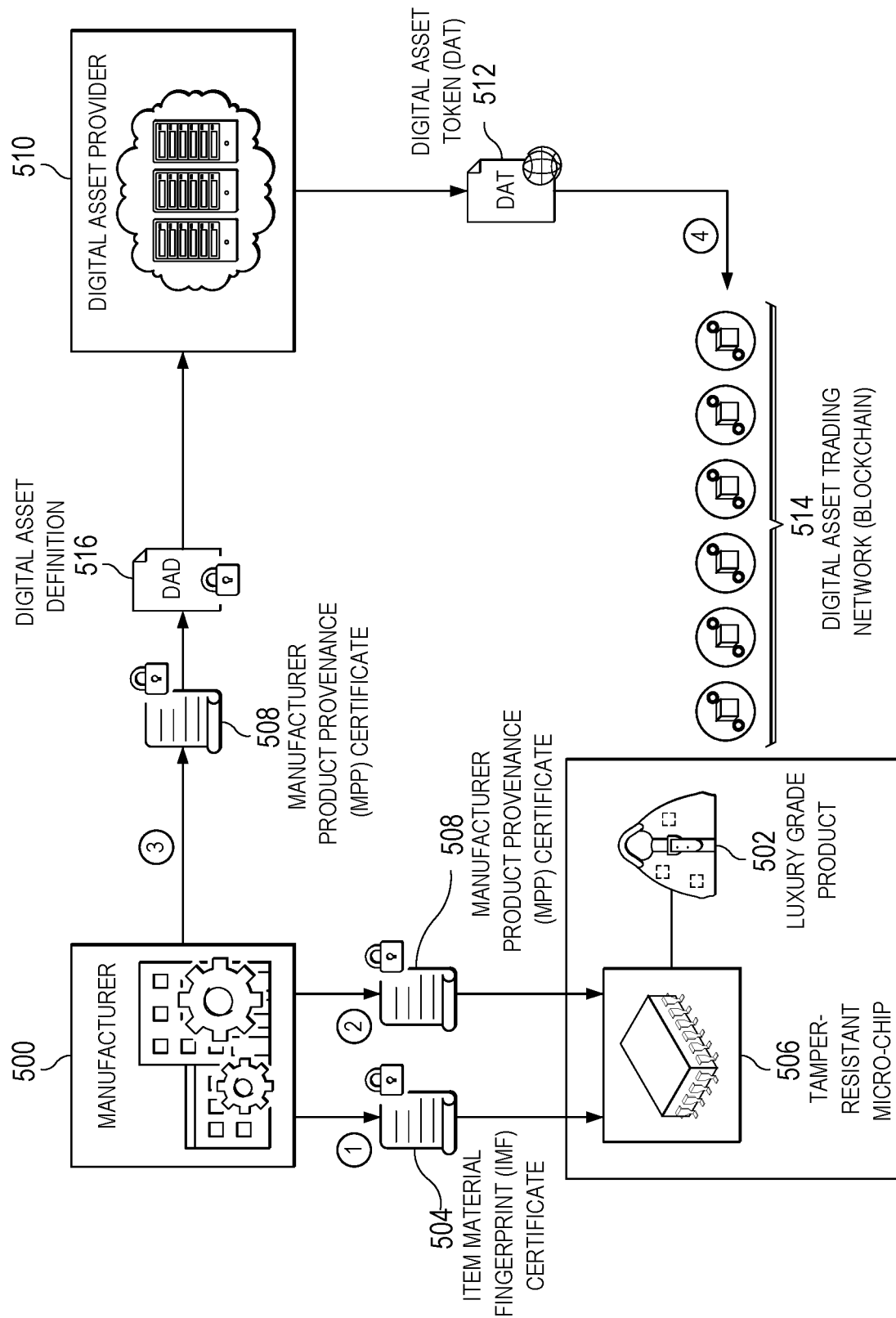
FIG. 5 is a diagram illustrating an overview of a process for tokenizing luxury-grade products according to some examples.

An example overview of steps involved to tokenize luxury-grade products that are counterfeit-resistant is provided in FIG. 5. At circle "1" in FIG. 5, in some examples, the manufacturer 500 of a luxury-grade product creates a limited number of instances (e.g., a total of ten) of the luxury-grade product. For each physical product instance, the manufacturer obtains the item's physical fingerprint, which is unique for each physical instance of the product (e.g., as illustrated herein with respect to FIG. 2).

In some examples, for each physical product instance 502, the manufacturer issues an item material fingerprint certificate 504. This certificate is stored inside a private database managed by the manufacturer 500 and another copy is stored in the protected and encrypted storage of the tamper-resistant hardware microprocessor 506. In some examples, the manufacturer 500 stores an encrypted copy of the item material fingerprint certificate 504 inside the tamper-resistant microchip 506. The encryption can be performed using the manufacturer instance public/private key pair, which is kept secret by the manufacturer 500.

One benefit of this type of evidence is to prove the provenance or origin of a physical product instance (e.g., from the brand-approved manufacturer) and to provide a means to detect counterfeits. In some examples, an authorized agent of the manufacturer (or "AAM"), such as a dealer/shop located overseas and who may evaluate an item (e.g., when the product instance is placed for sale on the secondary market), can request a copy of the manufacturer instance public key from the manufacturer. The manufacturer can deliver the public key over an authenticated and secure channel between the authorized agent of the manufacturer and the manufacturer. In some examples, the secure channel can be established between the authorized agent and the manufacturer using the brand manufacturer public key found in the microprocessor.

In some examples, using the manufacturer instance public key, the authorized agent can decrypt the item material fingerprint certificate as part of evaluating whether an item (e.g., brought into the shop by a customer) is counterfeit or not. Note that the manufacturer may possess multiple unique brand line public/private key pairs, where each key pair corresponds to a particular luxury-grade product line or series. For example, this may be due to some luxury-grade product lines being exclusive to only one region or country in the world (e.g., Europe, Middle East, Africa (EMEA) specific products lines, Japan-only product lines, etc.) and, as such, only the authorized agents in those particular locations may be in possession of the corresponding brand line public key for a region-exclusive series.

In some examples, at circle "2" in FIG. 5, the manufacturer 500 issues manufacturer product provenance (or "MPP") certificates 508 for each luxury-grade product instance. The manufacturer product provenance certificate 508 provides an assertion that a product instance is a genuine instance. One benefit of the manufacturer product provenance certificate 508 is that it permits a digital asset provider 510 (or "DAP") to create a token 512 on the blockchain 514 that represents the product instance, and which is founded on the guarantee from the manufacturer that (i) the product actually exists and (ii) that it is in the possession of the manufacturer.

In some examples, at circle "3," the manufacturer 500 creates a digital asset definition (or "DAD") file 516 and delivers both the manufacturer product provenance certificate 508 and the digital asset definition file 516 via a secure channel (e.g., a secure computer network channel) to a digital asset provider 510 entity.

In some examples, at circle "4," the digital asset provider 510 makes the digital asset token 512 available on a blockchain 514, assigning its ownership to the brand manufacturer 500. Generally speaking, in some examples, new luxury-grade products are initially owned by the brand manufacturer 500. Any entity seeking to purchase a luxury-grade product can purchase the token on the blockchain (e.g., a token 512), issuing payment to the blockchain address (e.g., transactions public key) of the brand manufacturer 500.

5.0. Tokenization of Heirloom-Grade Products

In some examples, the management of heirloom-grade products involves a more complex infrastructure and ecosystem because it includes collecting and genetically analyzing the biological fingerprint of an associated patron of the heirloom-grade product instance. More specifically, in some examples, an heirloom-grade product instance is associated with the following features in addition to that of a luxury-grade product instance: (i) the same (or stronger) anti-counterfeiting technical mechanisms and infrastructure are used for heirloom-grade products compared to luxury-grade products; (ii) the genome sequence of a patron (e.g., a person) is used to distinguish the heirloom-grade product instance as being originated from the patron; and (iii) heir entitlement rules are decided upon by the patron and are coded into the smart contracts that control the transferability of an heirloom-grade product instance off-chain (e.g., in the real world) and on-chain (e.g., transfers of tokens representing an heirloom-grade product instance).

Figure 6:
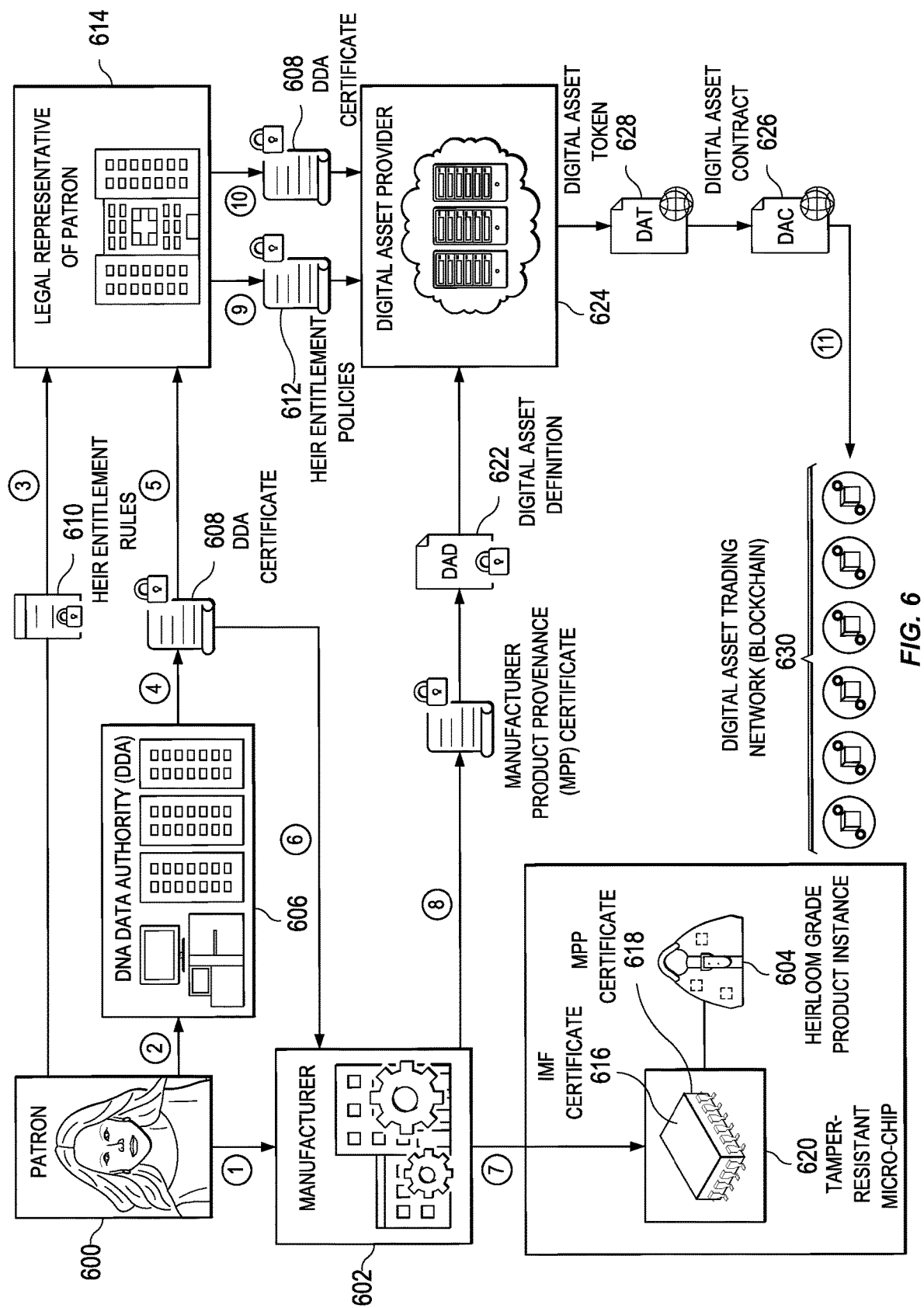
FIG. 6 is a diagram illustrating an overview of a process for tokenizing heirloom-grade products according to some examples.

FIG. 6 is a diagram illustrating an overview of a process for tokenizing heirloom-grade products according to some examples. In some examples, at circle "1" in FIG. 6, a patron 600 (e.g., a person) seeking to create an item instance (or a limited number of instances) of an heirloom-grade product requests a manufacturer 602 to create the heirloom-grade product instances (e.g., including heirloom-grade product instance 604). In some examples, the task of the manufacturer 602 includes obtaining and including two kinds of unique evidence for associated with the product instance. The first evidence (evidence type-1) is an item physical fingerprint, similar to the physical fingerprint discussed herein for luxury-grade product instances. The second evidence (evidence type-2) is a biological fingerprint of the human patron 600. In some examples, the biological fingerprint is obtained indirectly via a DNA data authority 606 (or "DDA") as described herein. One benefit of this type of evidence is to prove that a given product instance was manufactured for a given patron such that, e.g., future descendants of the patron can claim eligibility to some entitlements (if any) designated by the patron 600 based on rules set by the patron for the product instance.

At circle "2," in some examples, the patron 600 seeks to establish their unique biological fingerprint by way of genetic sequencing (e.g., a complete sequence) of their DNA or using other methods to biologically identify the patron uniquely and to identify relatives of the patron. In some examples, the patron visits a legally certified DNA data authority 606 (or "DDA"), which performs genetic sequencing of the patron. The patron provides some biological sample from which the patron's DNA can be obtained as the basis for genetic sequencing.

In some examples, a result of this step is a signed DNA data authority certificate 608 carrying unique information of the patron 600 (e.g., a cryptographic hash of the patron's genetic sequencing data). In some examples, the DNA data authority 606 keeps the complete genome sequencing data as confidential and private information (e.g., stored in a secured database).

At circle "3," in some examples, the patron creates heir entitlement rules 610 pertaining to the eligibility for claims of ownership based on a biological relationship to the patron 600. For example, the patron 600 can create heir ownership policies 612 (or "HOPs") for the bespoke heirloom-grade product instance 604 based on a specified set of heir entitlement rules 610. In some examples, heir ownership policies 612 represent rules indicating which persons on a patron's family tree are to be allowed to legally own an heirloom-grade product instance. A given policy, for example, may specify a sufficient degree of "closeness" in the family regardless of the financial means to acquire a product instance. A rule can also determine what happens to an heirloom-grade product instance when no claimant is eligible in the future (e.g., because a family tree dies out), such as automatically bequeathing it to a national museum under additional conditions.

In some examples, for example, a patron 600 can determine heir entitlement rules 610 based on a measure of the centimorgans (cMs) a relative has in common with the patron. The amount of cMs shared between two persons, for example, can be used to determine how closely the two persons are related to one another. The patron can then provide the rules to a legal representative of the patron (e.g., a family attorney).

At circle "4," in some examples, the DNA data authority 606 completes the genome sequencing of the patron's DNA and generates a DNA data authority certificate 608 for the patron 600 that includes a unique identifier of the patron 600 as well as a cryptographic, one-way hash of the file containing the derived unique sequence information for the patron 600. In many cases, the typical size of useful information in the genome sequence can be on the order of 125-200 megabytes. In some examples, the sequence data itself is not contained in the DNA data authority certificate 608 for the patron 600, but rather only a cryptographic hash of the data is stored, e.g., to protect the privacy of the patron. In some examples, the DNA data authority 606 digitally signs the certificate 608 using its public key of a public/private key pair associated with the DNA data authority 606. The public key of the DNA data authority 606, for example, may itself be encapsulated in a X.509 digital certificate structure issued by a commercial public key infrastructure (PM) certificate authority (CA).

In some examples, at circle "5," the DNA data authority 606 entity provides a copy of the signed DNA data authority certificate 608 for the patron 600 to the legal representative of the patron 614. For example, the legal representative 614 may be provided with a secure link to download the certificate 608 or otherwise provided with the certificate using a secure communication link. In some examples, the DNA data authority 606 optionally provides a copy of the full genome sequence file to the patron and/or the patron's legal representatives in a secure manner (e.g., via secure digital transmission or by providing a copy in person).

In some examples, at circle "6," the DNA data authority 606 entity provides a copy of the signed DNA data authority certificate 608 for the patron 600 to the manufacturer 602 responsible for creating the heirloom-grade product instance(s) for the patron. Optionally, the DNA data authority 606 also includes its own X.509 digital certificate issued by a certificate authority (CA).

At circle "7," in some examples, the manufacturer 602 extracts some data fields from the item material fingerprint (IMF) certificate 616 and the DNA data authority certificate 608 (obtained from the DNA data authority) to form the contents of a manufacturer product provenance (or "MPP") certificate 618. The manufacturer 600 can then cause encrypted copies of the (i) item material fingerprint certificate 616, and (ii) the manufacturer product provenance certificate 618 to be stored within the tamper-resistant hardware microchip 620. In some examples, encryption is performed using the instance private key, which is held securely by the manufacturer 602. In some examples, the DNA data authority certificate 608 is not stored within the tamper-resistant microchip 620, e.g., because of the private and sensitive nature of the DNA data authority certificate (e.g., it can be used to identify the patron).

In some examples, at circle "8," the manufacturer 602 creates a digital asset definition (or "DAD") file 622 for the heirloom-grade product instance 604 and delivers both the manufacturer product provenance certificate 618 and the DAD file 622 to a digital asset provider 624 entity via a secure channel (e.g., via an SSL/TLS-secured internet communication channel).

In some examples, at circle "9," the legal representative of the patron 614 creates heir ownership rules (or "HOPs") that express the patron's heir entitlement rules created in a proceeding step (e.g., specified as text-based rules). Optionally, the legal representative 614 or another entity can additionally create a smart contract implementing the heir ownership rules and provide the heir ownership rules file (with or without a corresponding smart contract) to the digital asset provider 624.

At circle "10," in some examples, the legal representative of the patron 614 countersigns a copy of the DNA data authority certificate 608 file (which it obtained from the DNA data authority 606 in a preceding step) and provides the resulting countersigned certificate to the digital asset provider 624.

At circle "11," the digital asset provider 624 creates a digital asset definition (or "DAD") based on the input received from the manufacturer 602 (e.g., the DAD 622 for the heirloom-grade product instance 604 and the manufacturer product provenance certificate 618) and from the legal representative of the patron 614 (e.g., the heir ownership rules and the DNA data authority certificate 608 file). If the legal representative of the patron did not include a smart contract, then the digital asset provider creates a smart contract 626 based on the heir ownership policies file it receives from the legal representative.

In some examples, the digital asset provider 624 creates an instance of the DAT 628 and digital asset contract 626 (or "DAC") present (e.g., based on the DAD) on a blockchain-based asset exchange network 630, effectively registering (e.g., publishing) simultaneously (i) the fact of the existence of the heirloom-grade product, (ii) its initial valuation (e.g., in dollar value) as expressed in the DAT, and (iii) the rules of ownership exchange and eligibility of new owners as expressed through the conditionals in the DAC smart contract.

6.0. Obtaining and Recording a Biological Fingerprint of Patron

As mentioned above, a luxury-grade product can be considered an heirloom-grade product if, among others, it is bound to a unique biological fingerprint of a patron of the item. In some examples, a process is used to obtain the digital evidence of a patron of a product instance or instances derived from the genomic sequencing of a biological sample of the patron.

6.1. Overview of Biological Fingerprinting Process

Figure 7:
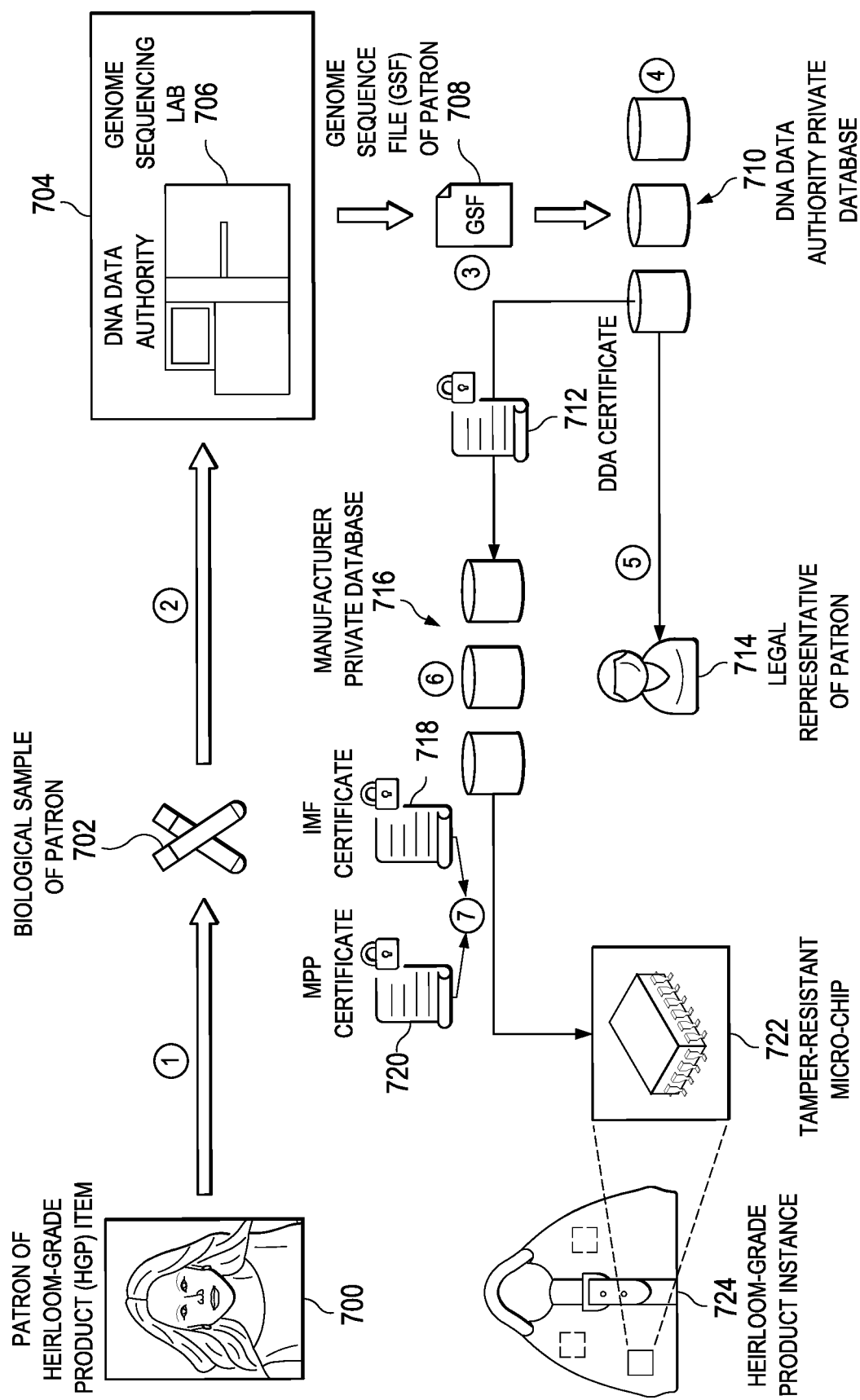
FIG. 7 is a diagram illustrating an example process for obtaining genome sequencing data from a patron and creating a DNA data authority (or "DDA") certificate according to some examples.

FIG. 7 is a diagram illustrating an example process for obtaining sequence data from a patron and creating a DNA data authority (or "DDA") certificate according to some examples. At circle "1" in FIG. 7, in some examples, a biological specimen of a patron 702 (e.g., a person) is obtained from the patron 700. The type of biological specimen (e.g., hair, blood, etc.) can be determined by the DNA data authority 704 (e.g., its DNA laboratory) in agreement with the heirloom-grade product manufacturer.

At circle "2," in some examples, the biological specimen of the patron 702 is analyzed by the DNA data authority 704 (e.g., by its DNA laboratory 706) and a genomic sequence is generated based on the specimen.

At circle "3," in some examples, the result of the genomic sequencing of the patron is stored in a genomic sequence file 708 (or "GSF") that can uniquely identify the patron 700 from other people and from among the patron's family members.

In some examples, at circle "4," the DNA data authority 704 securely stores the genomic sequence files 708 of the patron in its confidential private database 710.

In some examples, at circle "5," the DNA data authority 704 uses the genomic sequence file 708 of the patron (stored in its private database) to generate a DNA data authority certificate 712 for the patron. In some examples, the certificate 712 does not carry the genomic sequence file data but rather only carries a cryptographic hash of the genomic sequence file data 708. The DNA data authority certificate 712 can include a timestamp of the issuance of the certificate and can be signed by the DNA data authority 704. For example, this signature can be used to signify that the DNA data authority 704 attests legally to the truthfulness of the information contained in the DNA data authority certificate 712 and to the correctness of the genomic sequencing procedure that is employed to derive the genomic sequence file data.

At circle "6," in some examples, the DNA data authority 704 securely and confidentially provides a copy of the DNA data authority certificate 712 for the patron to (i) the manufacturer that requested the certificate, and (ii) the legal representative of the patron 714 (e.g., the patron's family lawyer). The product manufacturer can store a copy of the obtained DNA data authority certificate 712 within its private manufacturer database 716.

In some examples, at circle "7," the manufacturer extracts data fields from the item material fingerprint certificate 718 and the DNA data authority certificate 712 (obtained from the DNA data authority) to form the manufacturer product provenance certificate 720. The manufacturer can then cause encrypted copies of the (i) item material fingerprint certificate 718 and (ii) the manufacturer product provenance certificate 720 to be stored within the tamper-resistant microchip 722. In some examples, encryption is performed using the instance private key held by the manufacturer. In some examples, the DNA data authority certificate is not stored within the tamper-resistant microchip.

6.2. Biological Fingerprinting of Descendants

In some examples, the biological fingerprinting process described above is repeated by any descendants as part of proving their relationship to the patron. For example, the steps described in relation to circles "1" through circle "5" are to be performed by any person claiming to be an eligible descendant of the patron.

6.3. Biological Fingerprinting of Entitlements of Adoptees

As mentioned above, a patron may legally adopt one or more persons as children or descendants even though those persons may not be biologically related to the patron. A patron can perform the adoption even after an heirloom-grade product has completed manufacturing. In some examples, the biological fingerprinting of adoptees or other entitled persons can include:

Obtaining a biological fingerprint of the adoptee: In some examples, the adoptee (e.g., person) provide their biological samples in person to the DNA data authority, where the DNA data authority performs the relevant DNA fingerprinting (e.g., genomic sequencing) and produces a DNA data authority certificate for the adoptee.

Delivery of adoptee's DNA data authority certificate to legal representative of the patron: In some examples, the DNA data authority securely and confidentially provides a copy of the DNA data authority certificate to the legal representative of the patron.

Updating of heir entitlement rules to include adoptee: In some examples, if the patron desires to make the adoptee have entitlements to the heirloom-grade product instance, the patron updates the heir entitlement rules that the patron previously provided to the legal representative of the patron (e.g., see circle "3" of FIG. 6).

Updating digital asset contract to include adoptee: In some examples, the legal representative of the patron updates the on-chain digital asset contract with a new digital asset contract that reflects the updated heir entitlement rules incorporating the adoptee.

7.0. Digital Asset Tokens and Digital Asset Contracts

In some examples, the manufacturer of a product creates tokens with the assistance of a digital asset provider entity, as illustrated in FIG. 6. In some cases, the manufacturer and the digital asset provider are separate entities; in other cases, the manufacturer can include the functionality of the digital asset provider.

7.1. Digital Asset Definition and Digital Asset Tokens

Figure 8:
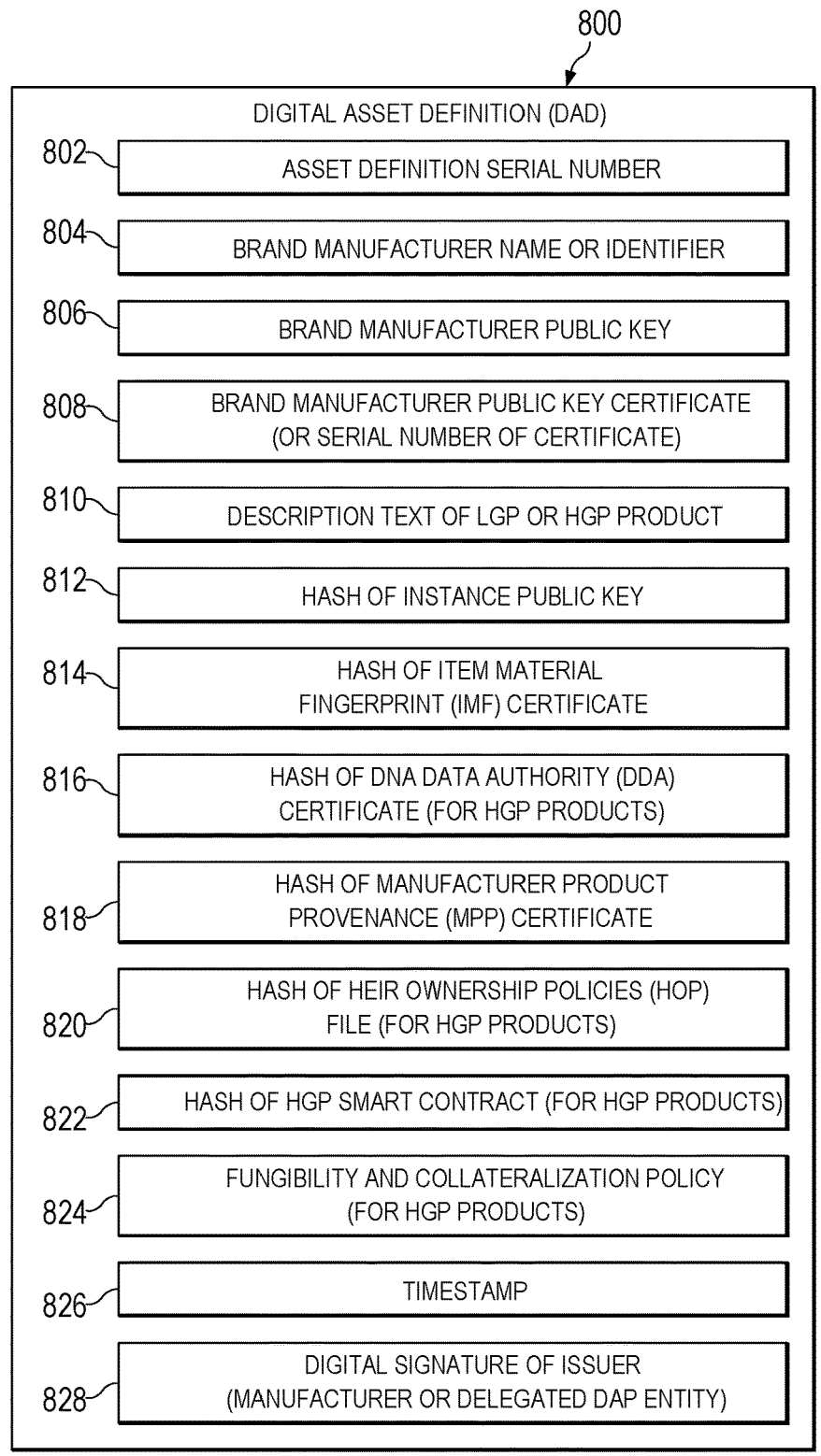
FIG. 8 illustrates an example format of a digital asset definition (or "DAD") for luxury-grade products and heirloom-grade products according to some examples.

In some examples, as the creator of a luxury-grade product or heirloom-grade product, the manufacturer also creates a digital representation of the created product instances. For example, a manufacturer can first create a digital asset definition (or "DAD"), which states the various factual information regarding the created product instances. The DAD, for example, permits a digital asset provider to create digital asset tokens (or "DAT") on a blockchain, which represents the product instances on-chain. FIG. 8 illustrates an example format of a digital asset definition (or "DAD") for luxury-grade products and heirloom-grade products according to some examples.

As shown in FIG. 8, a DAD can include some or all of the following data: an asset definition serial number 802, a brand manufacturer name or identifier 804, a brand manufacturer public key 806, a brand manufacturer public key certificate (or serial number of certificate) 808, a description text of luxury-grade product or heirloom-grade product 810, a hash of instance of public key 812, a hash of item material fingerprint (IMF) certificate 814, a hash of the DNA data authority (DDA) certificate 816 for heirloom-grade products, a hash of the manufacturer product provenance (MPP) certificate 818, a hash of heir ownership policies (HOP) file 820 (for heirloom-grade products), a hash of a heirloom-grade product smart contract 822 (for heirloom-grade products), a fungibility and collateralization policy 824 (for heirloom-grade products), a timestamp 826, and a digital signature of issuer 828 (the manufacturer or delated DAP entity).

In some examples, a digital asset provider creates a digital asset token for each of the N product instances that a manufacturer produces which conforms to the DAD file asserted by the manufacturer. The manufacturer securely delivers to the digital asset provider a list of the serial numbers of the N items defined by the DAD file. In some examples, the digital asset provider issues N distinct digital asset tokens on the blockchain, where each token includes the following fields (e.g., where some of the fields are obtained from the DAD file in FIG. 8): (i) a serial number of the product instance (e.g., as provided by the manufacturer); (ii) a brand manufacturer name (or unique identifier of the manufacturer); (iii) an asset definition serial number; (iv) a hash of the DAD file used to create the token; (v) a current owner blockchain address (e.g., public key of the manufacturer); (vi) an address (or identifier) of smart contract, if the item is an heirloom-grade product); (vii) a timestamp; and (viii) a digital signature of the digital asset provider.

Generally speaking, luxury-grade products have no ownership category limitations. That is, anyone who has the financial means can purchase on-chain a digital asset token corresponding to a luxury-grade product and then obtain the corresponding physical product instance from the manufacturer's agent (e.g., a dealer/store) or from its current owner.

7.2. Digital Asset Contracts for Heirloom-Grade Products

In the case of heirloom-grade products, the patron who initiated/requested the creation of an heirloom-grade product instance (and possibly paid for it) may have also defined some restrictions on which persons are permitted to acquire the heirloom-grade product item. These restrictions are listed by the patron in their heir entitlement rule file based on a biological relationship between the patron (or his/her descendants) and a potential buyer of the heirloom-grade product. A patron delivers the heir entitlement rules file to a legal representative of the patron. The legal representative of the patron can then counter sign the heir entitlement rules file and deliver the countersigned file to the digital asset provider.

In some examples, when a potential buyer or a claimant-heir (e.g., a person claiming to be an heir) desires to obtain an heirloom-grade product, the person proves the biological relationship of the person to the patron or to the patron's descendants. This can be performed at a legally recognized DNA data authority, where the buyer/claimant provides biological samples for genomic sequencing (e.g., similar to the process described above in relation to FIG. 7). The DNA data authority then produces a DNA data authority certificate for the buyer/claimant, where the certificate is delivered securely to a legal representative of the patron. In some examples, the legal representative of the patron can then ensure that the new buyer satisfies the constraints defined by the patron (e.g., as stated in the heir eligibility rules).

In some examples, the purchase or ownership transfer of an heirloom-grade product via its digital asset token is performed via a smart contract that implements the digital asset contract specified by the digital asset provider (e.g., following the heir entitlement rules defined by the patron). The digital asset contract smart contract software (e.g., in the blockchain) implements conditional logic specified in the heir entitlement rules.

Figure 9:
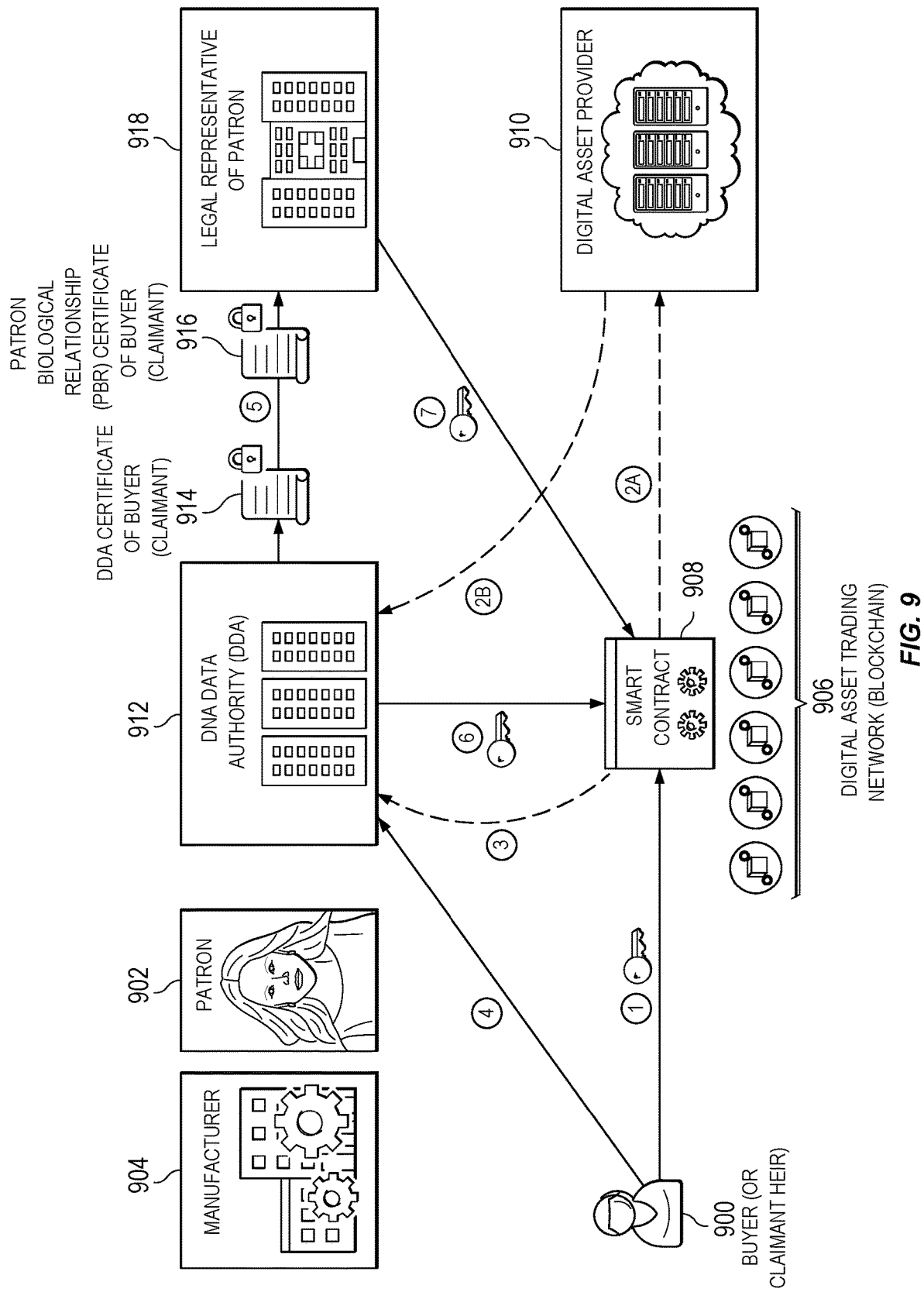
FIG. 9 is a diagram illustrating an overview of the acquisition of an heirloom-grade product by a potential buyer or heir-claimant according to some examples.

FIG. 9 is a diagram illustrating an overview of the acquisition of an heirloom-grade product by a potential buyer of heir-claimant according to some examples. At circle "1" in FIG. 9, in some examples, a buyer/claimant 900 of an heirloom-grade product instance uses a computing device to transmit a signed transaction on the blockchain 906 to acquire the digital asset token, where the transaction is addressed to the digital asset contract smart contract 908 specifically for the digital asset token corresponding to the heirloom-grade product instance. In some examples, the smart contract 908 writes a transaction pending (TX-PEND) log message to the ledger of the blockchain, thereby signaling that there is a request to acquire the heirloom-grade product instance.

At circles "2A" and "2B," in some examples, a digital asset provider 910 continuously monitors the state of the ledger and detects new entries pertaining to one of its smart contracts. In this example, the digital asset provider 910 identifies a new TX-PEND entry on the ledger at circle "2A" and then the digital asset provider 910 notifies the DNA data authority 912 that was involved in the tokenization of the heirloom-grade product instance (e.g., the DNA data authority 912 that issued the DNA data authority certificate for the patron).

Alternatively, at circle "3," the DNA data authority 912 may also monitor the state of the ledger to identify any new TX-PEND entries on the ledger pertaining to any of the digital asset tokens corresponding to any heirloom-grade product instances for which the DNA data authority 912 was involved (e.g., the patron was one of its customers).

In some examples, at circle "4," the DNA data authority 912 notifies the buyer/claimant, requesting the buyer/claimant to authenticate with the DNA data authority 912 and to provide evidence of biological relationship to the patron. If the buyer/claimant is unknown to the DNA data authority 912, the buyer/claimant provides biological samples in-person so that a genomic sequence can be performed.

In some examples, at circle "5," after performing a genomic sequencing of the buyer/claimant, the DNA data authority 912 issues (i) a DNA data authority certificate for the buyer/claimant 914, and (ii) a patron biological relationship certificate 916 reporting on the biological relationship between the buyer/claimant and the patron. In some examples, the DNA data authority 912 securely delivers the DNA data authority certificate 914 and the patron biological relationship certificate 916 the legal representative of the patron 918.

At circle "6," if the buyer/claimant is shown to have some biological relationship with the patron and he/she has been authenticated by the DNA data authority 912, the DNA data authority 912 then signs the relevant parameter in the smart contract on the blockchain 906 (e.g., using its private key). Otherwise, the DNA data authority 912 does nothing (e.g., allows a timer in the smart contract to expire).

In some examples, at circle "7," if the patron biological relationship certificate 916 for the buyer/claimant indicates the buyer/claimant satisfies the heir entitlement rules, the legal representative of the patron 918 then signs the relevant parameter in the smart contract 908 on the blockchain 906 (e.g., it uses its private key). Otherwise, it does nothing (e.g., allows a timer in the smart contract 908 to expire).

Once the smart contract 908 receives the signed parameter from the DNA data authority 912 and from the legal representative of the patron 918, in some examples, the smart contract 908 completes the process by assigning the digital asset token of the heirloom-grade product instance to the address (e.g., transaction public key) of the buyer/claimant. For example, this signifies that the buyer/claimant is now the new owner of the digital asset token and thus the owner of the corresponding physical heirloom-grade product instance.

7.3. Paired Restricted Items Belonging to an Heirloom-Grade Product Set

Figure 10:
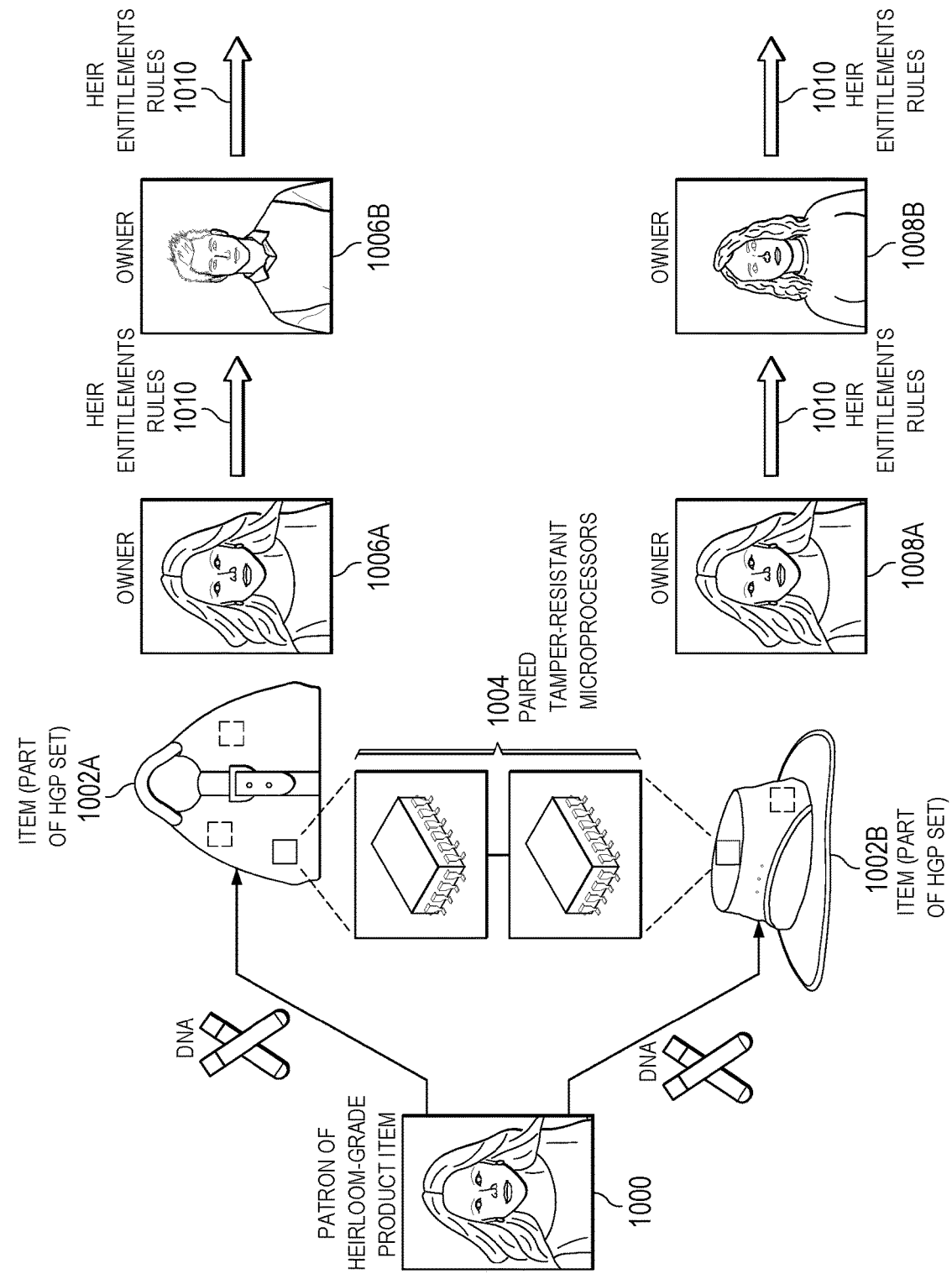
FIG. 10 is a diagram illustrating an overview of paired heirloom-grade product items (e.g., restricted items) belonging to an heirloom-grade product set, where heir entitlement rules constrain both to be simultaneously owned by descendants satisfying a biological relationship specified in the heir entitlement rules according to some examples.

In some examples, a given patron may have their biological fingerprint associated with two or more related heirloom-grade product instances with the intent being that these items form an heirloom-grade product set that is to stay together as far as possible. FIG. 10 is a diagram illustrating an overview of paired heirloom-grade product items (restricted) belonging to an heirloom-grade product set (e.g., including item 1002A and item 1002B), where the heir entitlement rules 1010 (or "HER") constrain both to be simultaneously owned by descendants satisfying a biological relationship to a patron of the heirloom-grade product item 1000 specified in the heir entitlement rules 1010 according to some examples.

In some examples, a patron can define heir entitlement rules permitting different descendants of the patron to own one part of an heirloom-grade product set. In the case of the heirloom-grade product sets, in some examples, the tamper-resistant microchip coupled to each product instance is cryptographically bound to one another. Thus, for example, the item 1002A and item 1002B in FIG. 10 are paired by virtue of their tamper-resistant microchips being paired.

8.0. Bidding Smart Contract for Heirloom-Grade Product Instances and Properties As mentioned previously, a patron who custom orders an heirloom-grade product instance may establish heir entitlement rules representing the wishes of the patron. The heir entitlement rules are then encoded into a digital asset contract smart contract on the blockchain, where the digital asset contract smart contract enforces a specified set of heir entitlement rules on the blockchain. In the following, the use of the term "descendants" includes persons biologically related to a patron and also persons adopted by the patron.

8.1. Group Bidding Based on Relationship Distance to Patron

In some examples, a given patron can establish heir entitlement rules that permit multiple combinations between (i) the relationship distance of a descendant to the patron (e.g., as measured in centimorgans) and (ii) the evidence of purchasing power of the descendant. Thus, as an example, a patron can state in an heir entitlement rule that any potential claimant of an heirloom-grade product instance must share at least 900 cM with the patron. However, this can lead to a scenario of multiple descendants being eligible to claim an heirloom-grade product instance. For example, using the minimal 900 cM measurement, any of the following descendants may become eligible under the example heir entitlement rule: first cousins, half-aunt/uncles, half-niece/nephews, great-grandparent, great-grandchildren, great-aunt/uncle, and great-niece/nephews.

In order to prevent family disputes among descendants, in some examples, the heir entitlement rules can be implemented using a bidding smart contract (or "BSC") together with a digital asset contract s mart contract and digital asset token.

In some examples, in a bidding smart contract, additional considerations can be placed on claimants that can prove biological relationship to a patron including, for example:

Minimal biological relationship measure to the patron: This can be measured in the centimorgans values that a claimant proves (e.g., at least 900 cM in common with the patron, in the example above).

Temporary identity confidentiality (e.g., temporary anonymity) of the claimant: In some examples, while within the bidding period, a claimant may use its cryptographic keys as input to the bidding smart contract in an anonymous fashion. This is to prevent, for example, other eligible claimants from seeing the identity of the bidder. If the claimant wins the bid, then he or she reveals their digital identity certificate (e.g., a X.509 certificate) showing legal evidence of the person owning the public/private key pair used for the bidding.

Minimal escrow of funds by claimant: In some examples, the claimant entering the bid escrows funds on the blockchain, assigning the funds to the address (e.g., public key) of the current owner of the heirloom-grade product instance.

Descendant group-bids using pooled biological evidences: In some examples, the heir entitlement rules of the patron may permit a group or collective of descendants to bid as a single entity (without membership overlap), where the rules permit the collective bidder with the highest cumulative centimorgans winning the bid (subject to available funds). For example, the heir entitlement rules may specify that a claimant/bidder must have minimal 7,500 centimorgans in common with the patron (where parents and their children only share on average 3,000 cM). This may be achieved, for example, by several children and descendants of the patron summing their biological relationship measurements. For example, any two siblings (2,500 cM each) with any four first-cousins (850 cM each) can sum their cM values to reach the designated minimal 7,500 centimorgans.

8.2. Group Bidding Process

Figure 11:
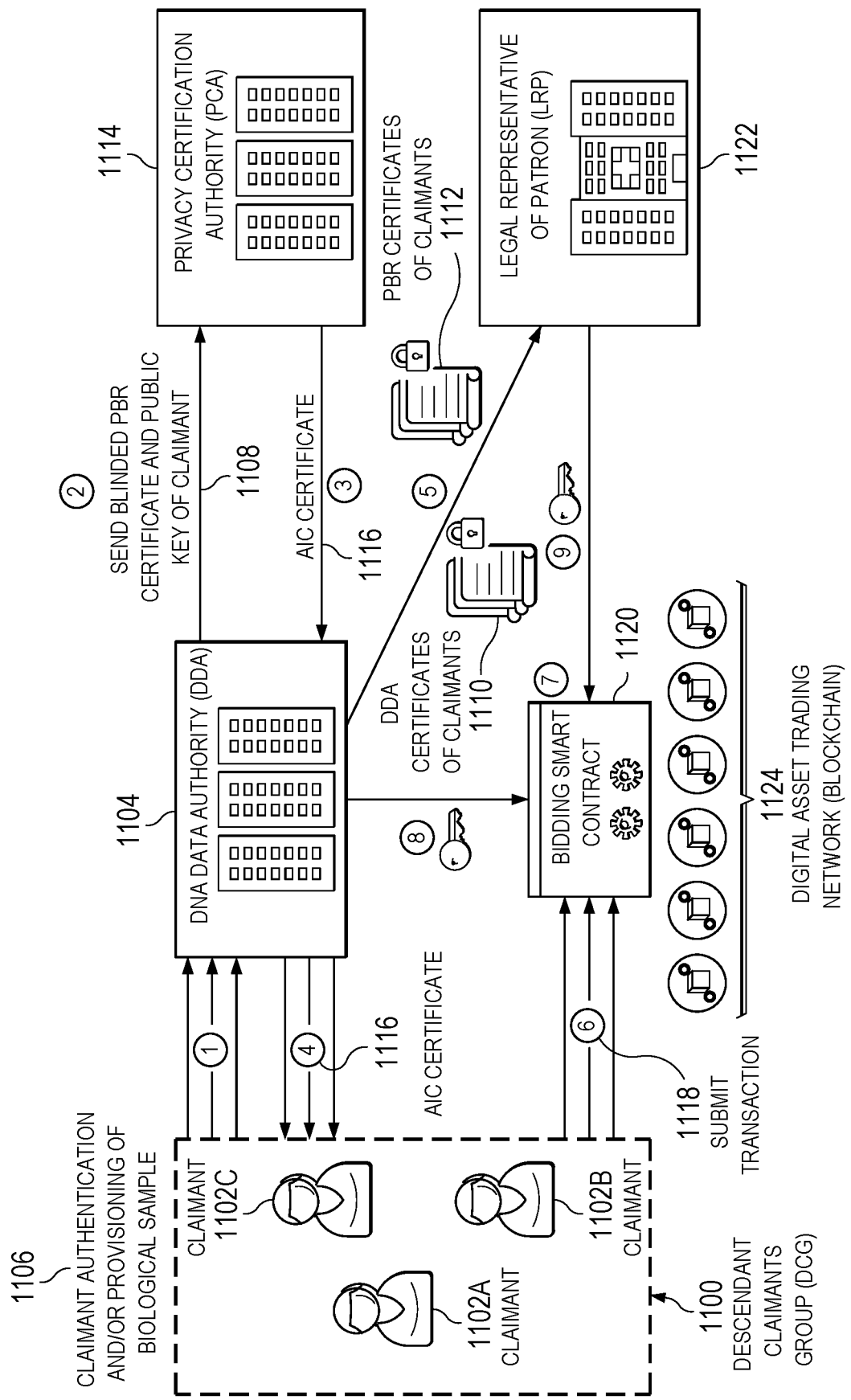
FIG. 11 is a diagram illustrating an overview of a group bidding process involving a collection of descendants of a patron according to some examples.

FIG. 11 is a diagram illustrating an overview of group bidding by a collective of descendants of a patron according to some examples. At circle "1" in FIG. 11, in some examples, each of the persons in a descendant-claimants group 1100 (or "DCG") (e.g., including a claimant 1102A, a claimant 1102B, and a claimant 1102C) contacts the DNA data authority entity 1104 ahead of the bid closing time, uses a computing device to authenticate themselves to the DDA entity, and provides evidence of biological relationship to the patron. If one or more person in the group 1100 is unknown to the DNA data authority entity 1104, the claimant provides biological samples in-person to the DNA data authority entity so that a genomic sequencing can be performed (e.g., shown collectively as claimant authentication and/or provisioning of biological sample 1106). Additionally, in some examples, each of the claimants in the group 1100 uses a computing device to independently deliver his/her public key (blockchain address) over a secure channel to the DNA data authority entity.

In some examples, at circle "2," after performing the genomic sequencing of any new claimants in the descendant-claimants group, the DNA data authority 1104 creates (a) a DNA data authority certificate for each of the N claimants (e.g., shown as DDA certificates of claimants 1110) and retains the certificates in its local database, and (b) issues a blinded patron biological relationship (or "BPBR") certificate 1108 for each of the N claimants, reporting on the biological relationship between the claimant and the patron.

In some examples, the blinded patron biological relationship certificate carries the relationship-distance measurement (or "RDM") value of the claimant to patron. This is typically the DNA-based numerical representation of the relationship between a person and the patron. As an example, this can be the shared centimorgans (cM) of a person with the patron.

For each claimant, in some examples, the DNA data authority entity uses a computing device to securely deliver the following to a privacy certification authority 1114 (or "PCA"): (i) the blinded patron biological relationship certificate for the claimant and (ii) the public key (blockchain address) of the claimant obtained from the claimant at circle "1." In some examples, the DNA data authority 1104 entity requests the private certification authority entity to create N separate anonymous identity certificates 1116 (or "AIC") for the N members of the descendant-claimants group 1100.

At circle "3," in some examples, for each of the N members of the group 1100, the privacy certification authority 1114 uses the received blinded patron biological relationship certificate for that member to create/issue a signed anonymous identity certificate 1116 including some or all of: (i) a certificate serial number; (ii) a unique global identifier for the claimant; (iii) the relationship distance measurement values as reported in the blinded patron biological relationship certificate; (iv) a hash of the blinded patron biological relationship certificate; (v) a public key of the claimant (e.g., as delivered by the DNA data authority entity at circle "2"); (vi) a timestamp; and (vii) a digital signature of the privacy certification authority. In some examples, the privacy certification authority 1114 returns the N anonymous identity certificates to the DNA data authority entity.

At circle "4," in some examples, the DNA data authority 1104 entity returns each of the N anonymous identity certificates 1116 to their respective owners (claimants) in the descendant-claimants group 1100. The DNA data authority 1104 entity also returns a copy of the patron biological relationship certificate to each member respectively (those who have not previously been genomic sequenced by the DNA data authority 1104 entity).

In some examples, at circle "5," for each of the N claimants in the group 1100, the DNA data authority 1104 entity securely delivers: (i) their DNA data authority certificate and (ii) their patron biological relationship certificate to the legal representative of the patron 1122.

In some examples, at circle "6," to complete the bid, each of the N members within the descendant-claimants group 1100 independently submits a transaction 1118 (e.g., invokes the bidding smart contract 1120) by supplying the following parameters into the smart contract 1120: (i) the anonymous-identity certificate of the claimant (e.g., the certificate issued by the privacy certification authority 1114 at circle "3"); (ii) the list of all the public keys of the members within the descendant-claimants group 1100 who are bidding; (iii) the blockchain address (public key) of the new owner (e.g., the public key to which the digital asset token of the heirloom-grade product is to be assigned on the blockchain 1124; (iv) the claimant's signature over all the above parameters (e.g., to ensure that the parameters are authentically supplied from the claimant who is a member of the descendant-claimants group 1100).

In some examples, at circle "7," the bidding smart contract 1120 implements the computation logic that performs the following tasks:

Validates authenticity of certificates: In some examples, the smart contract 1120 validates the signature on each of the received anonymous-identity certificates from all the members of the descendant-claimants group 1100. It also validates the signatures on all the transaction requests from the members of the group.

Checks consistency of descendant-claimants group membership list: In some examples, the smart contract 1120 validates that each of the transaction submitted (independently) by the members of the descendant-claimants group 1100 are the same (e.g., the list of public keys stated is all the same in all the received transaction requests). That is, it detects any attempts of cheating.

Sums relationship-distance measurement values: In some examples, the smart contract 1120 computes a sum of the relationship-distance measurement values found in each of the anonymous-identity certificates (AIC) from the members of the descendant-claimants group 1100. For example, this can involve computing a sum of the centimorgan values found in the anonymous-identity certificates. Note that the patron may have defined a more complex computation formula based on the location of a descendant in the family tree (e.g., a rule might state a descendant must have at least two children, one first-cousin, four second-cousins, etc.). This complex formula can be implemented by the bidding smart contract 1120.

Compares against the heir ownership policies in the smart contract: In some examples, the bidding smart contract 1120 (similar to the digital asset contract contract) embodies the heir ownership policies that were defined by the legal representative of the patron 1122 based on the patron's heir entitlement rules.

Records outcome of bid to the ledger: In some examples, the bidding smart contract 1120 records a bid status report onto the ledger of the blockchain 1124, signaling to the DNA data authority 1104 entity and to the legal representative of the patron 1122 that the outcome is to be endorsed. If the bid fails (e.g., based pm insufficient relationship-distance measurement values or an incorrect composition of membership of the descendant-claimants group 1100), then the bid status report on the ledger states the cause of the failure (e.g. using a failure cause code), and the DNA data authority 1104 entity and the legal representative of the patron 1122 do nothing more (e.g., allow a timer in smart contract to expire).

In some examples, at circle "8," if the bid is successful (as recorded in the bid status report on the ledger), the DNA data authority 1104 entity endorses the successful bid. This is performed, for example, by the DNA data authority 1104 entity sending a signed transaction to the blockchain 1124 (e.g., an ordinary transaction) that includes a hash of the bid status report on the ledger. Alternatively, a separate endorsement smart contract can be created that performs this task, where the endorsement smart contract receives as input parameters including (a) a signature of the DNA data authority 1104 entity and (b) the hash of the bid status report found on the ledger.

In some examples, at circle "9," the legal representative of the patron 1122 endorses the successful bid by sending a signed transaction to the blockchain 1124 that incorporates hash of the bid status report on the ledger. Alternatively, an endorsement smart contract can be created that performs this task which receives as input parameters including (a) the signature of the legal representative of the patron 1122 and (b) a hash of the bid status report found on the ledger.

In some examples, publication of the claimants' identities is optionally performed. If the bid by the descendant-claimants group 1100 is successful and has been endorsed by both the DNA data authority 1104 entity and the legal representative of the patron 1122, then the DNA data authority 1104 entity can optionally reveal the true identity of the claimants who are members of the descendants-claimants group 1100. Note that prior to this stage, only the anonymous identity certificates 1116 were employed (as in relation to circle "5"), where these anonymous identity certificates 1116 include only a global unique identifier of the claimant (not their full legal name).

8.3. Group Bidding on Other Types of Properties

In some examples, the bidding smart contract can be used for other types of properties that the patron wishes to retain within a family tree. For example, a piece of land (e.g., according to land ownership deeds) can be given to the patron descendants using the same smart contract process that requires the claimant(s) to prove biological relationship-distance measurements to the patron.

9.0. Future Generations of Descendants

In some examples, the original (e.g., first generation) heir entitlement rules specified by a patron may require that the rules be observed in perpetuity (i.e., forever). It is the task of the legal representative of the patron, such as the family lawyer, to ensure such heir entitlement rules remain enforced down the generations of descendants. In some examples, this reflects why the legal representative of the patron endorses any transfer on the blockchain.

However, in some cases a patron may define an heir entitlement rule that are to hold true (i.e., be observed) for (i) a limited number of times, or (ii) a limited number of generational hops down the family tree. Thus, for example, an original heir entitlement rule can state that the heir entitlement rules are to be observed for 100 years. Alternatively, an original heir entitlement rules can specific that it is to be enforced down to three (3) generations of descendants (e.g., to the grandchildren of the patron).

In cases where a set of heir entitlement rules have expired, the current owner of an heirloom-grade product instance can either create new heir entitlement rules (and employ the same process above), or it may simply dispense away with heir entitlement (i.e., no new rules). Regardless of the choice, the heirloom-grade product instance will still carry the biological provenance of the original patron, as described herein. That is, even if an heirloom-grade product instance eventually "leaves the family" at some point in the future, the heirloom-grade product instance still carries the biological evidence of the original patron, thereby making it a scarce good that can be traded using a digital asset token and digital asset contract smart contract on the blockchain.

Figure 12:
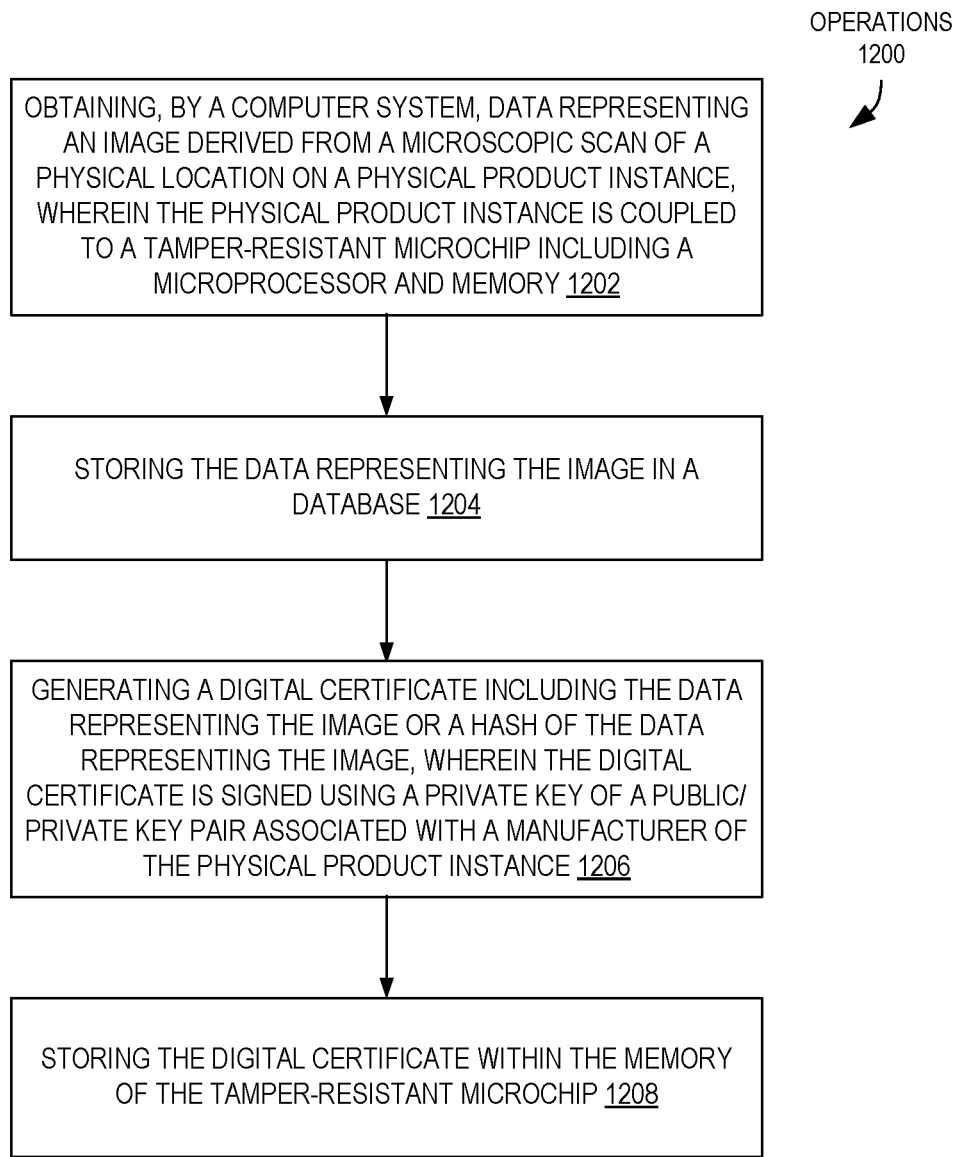
FIG. 12 is a flow diagram illustrating operations of a method for creating a material fingerprint of a physical product instance and storing a representation of the material fingerprint in a tamper-resistant microchip coupled to the physical product instance according to some examples.

FIG. 12 is a flow diagram illustrating operations 1200 of a method for creating a material fingerprint of a physical product instance and storing a representation of the material fingerprint in a tamper-resistant microchip coupled to the physical product instance according to some examples. Some or all of the operations 1200 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1200 are performed by a digital asset provider or other components of the other figures.

The operations 1200 include, at block 1202, obtaining, by a computer system, data representing an image derived from a microscopic scan of a physical location on a physical product instance, wherein the physical product instance is coupled to a tamper-resistant microchip including a microprocessor and memory.

The operations 1200 further include, at block 1204, storing the data representing the image in a database.

The operations 1200 further include, at block 1206, generating a digital certificate including the data representing the image or a hash of the data representing the image, wherein the digital certificate is signed using a private key of a public/private key pair associated with a manufacturer of the physical product instance The operations 1200 further include, at block 1208, storing the digital certificate within the memory of the tamper-resistant microchip.

In some examples, the physical product instance is a designer good produced in limited quantities, and wherein the manufacturer produces a limited quantity of the designer good.

In some examples, the tamper-resistant microchip is embedded in the product instance.

In some examples, the data further represents a plurality of images derived from microscopic scans of a plurality of physical locations on the physical product instance.

In some examples, the database is managed by the manufacturer of the physical product instance.

In some examples, the operations further include obtaining, from the tamper-resistant microchip, the digital certificate.

In some examples, the digital certificate includes at least one of: a unique identifier of the physical product instance, an identifier of the manufacturer, or a key identifier of a public key assigned to the physical product instance.

In some examples, the tamper-resistant microchip includes a public/private key pair that is assigned to the tamper-resistant microchip, an internal certificate public/private key pair used to prove a cryptographic binding of other keys, a product instance key pair that is assigned to the physical product instance, and a public key associated with the manufacturer.

In some examples, the tamper-resistant microchip further includes a public key associated with a patron of the physical product instance.

In some examples, the operations further include storing, on a digital asset trading network, a digital asset token representing the physical product instance.

FIG. 13 is a flow diagram illustrating operations 1300 of a method for tokenizing a luxury-grade product instance and storing a tokenized representation of a luxury-grade product instance using decentralized ledger technology according to some examples. Some or all of the operations 1300 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1300 are performed by digital asset provider or other components of the other figures.

The operations 1300 include, at block 1302, obtaining, by a digital asset provider, (i) a digital asset definition (DAD) file including information uniquely identifying a physical product instance and (ii) a digital certificate uniquely identifying a manufacturer of the physical product instance.

The operations 1300 further include, at block 1304, generating a digital asset token based on the DAD file and the digital certificate.

The operations 1300 further include, at block 1306, storing the digital asset token using decentralized ledger technology.

FIG. 14 is a flow diagram illustrating operations 1400 of a method for tokenizing an heirloom-grade product instance and storing a tokenized representation of an heirloom-grade product instance using decentralized ledger technology according to some examples. Some or all of the operations 1400 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1400 are performed by digital asset provider or other components of the other figures.

The operations 1400 include, at block 1402, obtaining, by a digital asset provider, (i) a digital asset definition (DAD) file including information uniquely identifying a physical product instance, and (ii) a digital certificate uniquely identifying a manufacturer of the physical product instance, wherein the digital certificate includes deoxyribonucleic acid (DNA) data obtained from a DNA data authority, wherein the DNA data uniquely identifies a person associated with the physical product instance.

The operations 1400 further include, at block 1404, generating a digital asset token based on the DAD file and the digital certificate.

The operations 1400 further include, at block 1406, storing the digital asset token using decentralized ledger technology.

Figure 15:
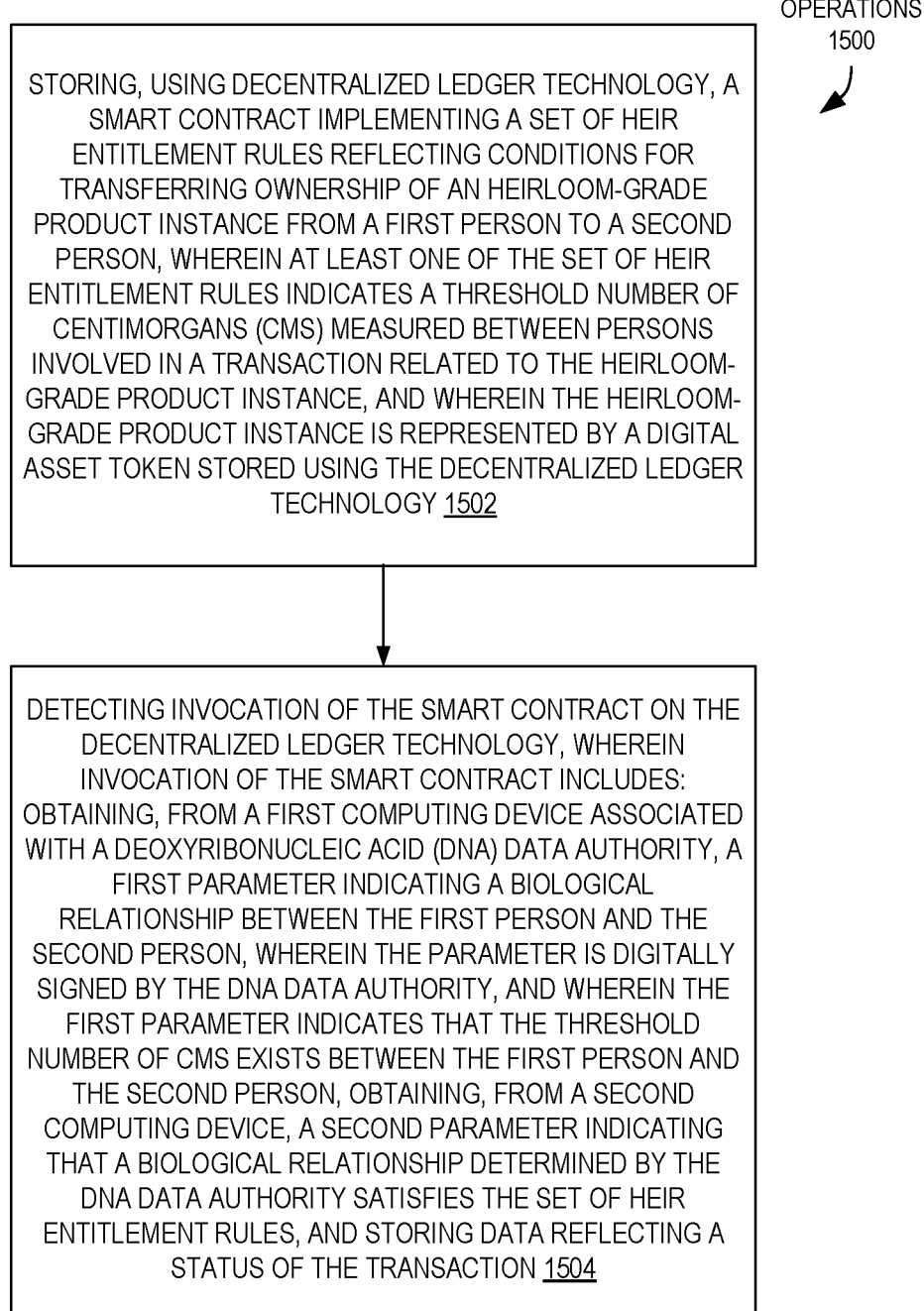
FIG. 15 is a flow diagram illustrating operations of a method for using a smart contract to verify the permissibility of an heirloom-grade product instance transaction based on centimorgan (cM) numbers of at least two persons involved in the transaction according to some examples.

FIG. 15 is a flow diagram illustrating operations 1500 of a method for using a smart contract to verify the permissibility of an heirloom-grade product instance transaction based on centimorgan (cM) numbers of at least two persons involved in the transaction according to some examples. Some or all of the operations 'Z00 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1500 are performed by digital asset provider or other components of the other figures.

The operations 1500 include, at block 1502, storing, using decentralized ledger technology, a smart contract implementing a set of heir entitlement rules reflecting conditions for transferring ownership of an heirloom-grade product instance from a first person to a second person, wherein at least one of the set of heir entitlement rules indicates a threshold number of centimorgans (cMs) measured between persons involved in a transaction related to the heirloom-grade product instance, and wherein the heirloom-grade product instance is represented by a digital asset token stored using the decentralized ledger technology.

The operations 1500 further include, at block 1504, detecting invocation of the smart contract on the decentralized ledger technology, wherein invocation of the smart contract includes: obtaining, from a first computing device associated with a deoxyribonucleic acid (DNA) data authority, a first parameter indicating a biological relationship between the first person and the second person, wherein the parameter is digitally signed by the DNA data authority, and wherein the first parameter indicates that the threshold number of cMs exists between the first person and the second person, obtaining, from a second computing device, a second parameter indicating that a biological relationship determined by the DNA data authority satisfies the set of heir entitlement rules, and storing data reflecting a status of the transaction.

Implementation Mechanism—Hardware Overview

According to one example, the techniques described herein are implemented by one or more special-purpose computing devices. The special-purpose computing devices may be desktop computer systems, portable computer systems, handheld devices, networking devices or any other device that incorporates hard-wired and/or program logic to implement the techniques. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

Figure 16:
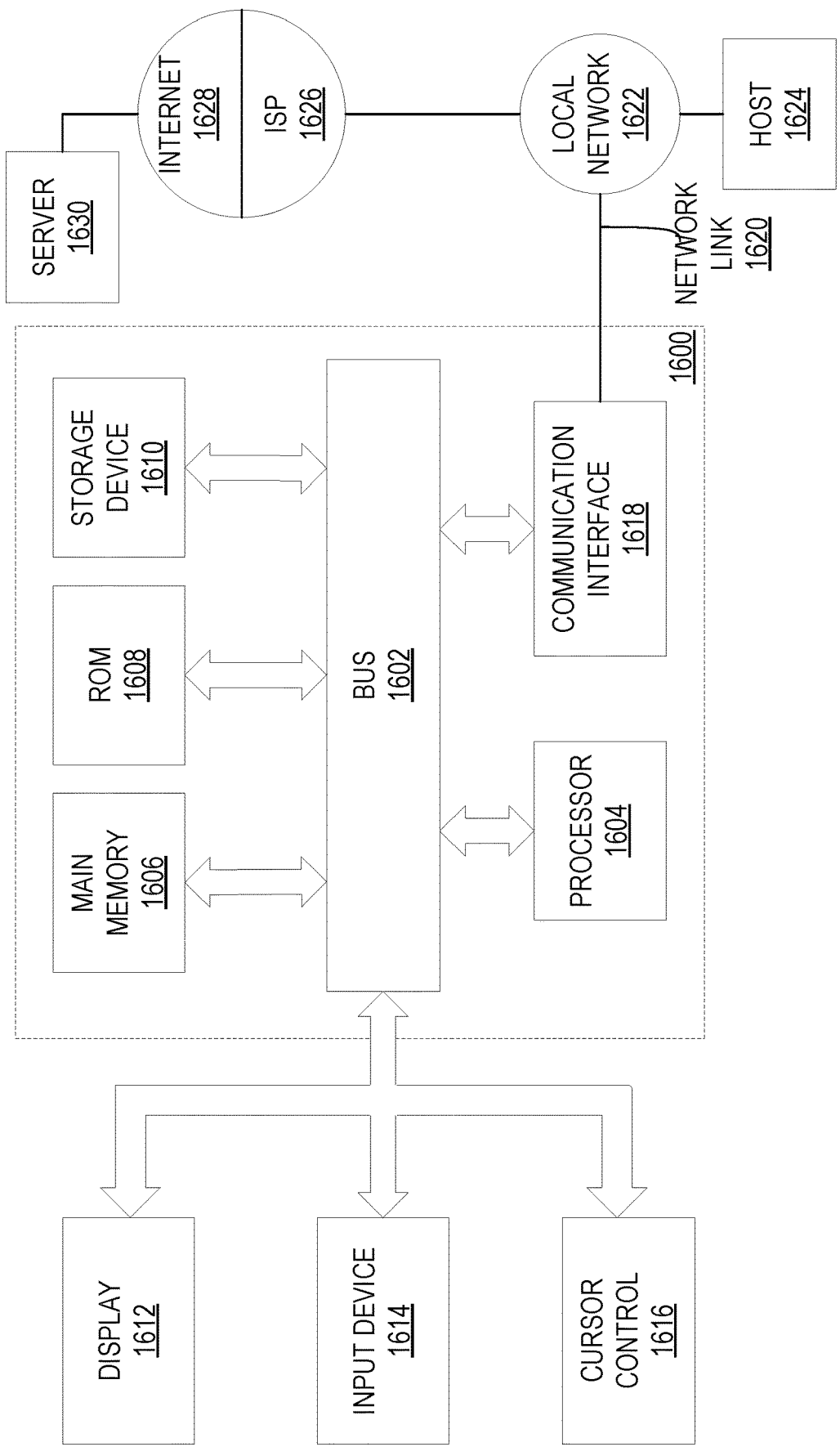
FIG. 16 is a block diagram illustrating an example computer system that may be used in some examples.

FIG. 16 is a block diagram that illustrates a computer system 1600 utilized in implementing the above-described techniques, according to an example. Computer system 1600 may be, for example, a desktop computing device, laptop computing device, tablet, smartphone, server appliance, computing mainframe, multimedia device, handheld device, networking apparatus, or any other suitable device.

Computer system 1600 includes one or more buses 1602 or other communication mechanism for communicating information, and one or more hardware processors 1604 coupled with buses 1602 for processing information. Hardware processors 1604 may be, for example, general purpose microprocessors. Buses 1602 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1600 also includes a main memory 1606, such as a random access memory (RAM) or other dynamic or volatile storage device, coupled to bus 1602 for storing information and instructions to be executed by processor 1604. Main memory 1606 also may be used for storing temporary variables or other intermediate information during execution of instructions to be executed by processor 1604. Such instructions, when stored in non-transitory storage media accessible to processor 1604, render computer system 1600 a special-purpose machine that is customized to perform the operations specified in the instructions.

Computer system 1600 further includes one or more read only memories (ROM) 1608 or other static storage devices coupled to bus 1602 for storing static information and instructions for processor 1604. One or more storage devices 1610, such as a solid-state drive (SSD), magnetic disk, optical disk, or other suitable non-volatile storage device, is provided and coupled to bus 1602 for storing information and instructions.

Computer system 1600 may be coupled via bus 1602 to one or more displays 1612 for presenting information to a computer user. For instance, computer system 1600 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1612 may include, without limitation, plasma display devices, projectors, cathode ray tube (CRT) monitors, electronic paper, virtual reality headsets, braille terminal, and/or any other suitable device for outputting information to a computer user. In an example, any suitable type of output device, such as, for instance, an audio speaker or printer, may be utilized instead of a display 1612.

One or more input devices 1614 are coupled to bus 1602 for communicating information and command selections to processor 1604. One example of an input device 1614 is a keyboard, including alphanumeric and other keys. Another type of user input device 1614 is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane. Yet other examples of suitable input devices 1614 include a touch-screen panel affixed to a display 1612, cameras, microphones, accelerometers, motion detectors, and/or other sensors. In an example, a network-based input device 1614 may be utilized. In such an example, user input and/or other information or commands may be relayed via routers and/or switches on a Local Area Network (LAN) or other suitable shared network, or via a peer-to-peer network, from the input device 1614 to a network link 1620 on the computer system 1600.

A computer system 1600 may implement techniques described herein using customized hard-wired logic, one or more ASICs or FPGAs, firmware and/or program logic which in combination with the computer system causes or programs computer system 1600 to be a special-purpose machine. According to one example, the techniques herein are performed by computer system 1600 in response to processor 1604 executing one or more sequences of one or more instructions contained in main memory 1606. Such instructions may be read into main memory 1606 from another storage medium, such as storage device 1610. Execution of the sequences of instructions contained in main memory 1606 causes processor 1604 to perform the process steps described herein. In alternative examples, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1610. Volatile media includes dynamic memory, such as main memory 1606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1602. Transmission media can also take the form of acoustic or light waves, such as those generated during radio-wave and infra-red data communications.

Various forms of media may be involved in carrying one or more sequences of one or more instructions to processor 1604 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 1600 can receive the data on the network and demodulate the signal to decode the transmitted instructions. Appropriate circuitry can then place the data on bus 1602. Bus 1602 carries the data to main memory 1606, from which processor 1604 retrieves and executes the instructions. The instructions received by main memory 1606 may optionally be stored on storage device 1610 either before or after execution by processor 1604.

A computer system 1600 may also include, in an example, one or more communication interfaces 1618 coupled to bus 1602. A communication interface 1618 provides a data communication coupling, typically two-way, to a network link 1620 that is connected to a local network 1622. For example, a communication interface 1618 may be an integrated services digital network (ISDN) card, cable modem, satellite modem, or a modem to provide a data communication connection to a corresponding type of telephone line. As another example, the one or more communication interfaces 1618 may include a local area network (LAN) card to provide a data communication connection to a compatible LAN. As yet another example, the one or more communication interfaces 1618 may include a wireless network interface controller, such as a 802.11-based controller, Bluetooth controller, Long Term Evolution (LTE) modem, and/or other types of wireless interfaces. In any such implementation, communication interface 1618 sends and receives electrical, electromagnetic, or optical signals that carry digital data streams representing various types of information.

Network link 1620 typically provides data communication through one or more networks to other data devices. For example, network link 1620 may provide a connection through local network 1622 to a host computer 1624 or to data equipment operated by a Service Provider 1626. Service Provider 1626, which may for example be an Internet Service Provider (ISP), in turn provides data communication services through a wide area network, such as the world wide packet data communication network now commonly referred to as the "Internet" 1628. Local network 1622 and Internet 1628 both use electrical, electromagnetic, or optical signals that carry digital data streams. The signals through the various networks and the signals on network link 1620 and through communication interface 1618, which carry the digital data to and from computer system 1600, are example forms of transmission media.

In an example, computer system 1600 can send messages and receive data, including program code and/or other types of instructions, through the network(s), network link 1620, and communication interface 1618. In the Internet example, a server 1630 might transmit a requested code for an application program through Internet 1628, ISP 1626, local network 1622 and communication interface 1618. The received code may be executed by processor 1604 as it is received, and/or stored in storage device 1610, or other non-volatile storage for later execution. As another example, information received via a network link 1620 may be interpreted and/or processed by a software component of the computer system 1600, such as a web browser, application, or server, which in turn issues instructions based thereon to a processor 1604, possibly via an operating system and/or other intermediate layers of software components.

In an example, some or all of the systems described herein may be or comprise server computer systems, including one or more computer systems 1600 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an example, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an example, the cloud-based components may be implemented by third-party entities, on behalf of another entity for whom the components are deployed. In other examples, however, the described systems may be implemented entirely by computer systems owned and operated by a single entity.

In an example, an apparatus comprises a processor and is configured to perform any of the foregoing methods. In an example, a non-transitory computer readable storage medium, storing software instructions, which when executed by one or more processors cause performance of any of the foregoing methods.

Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, examples of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate examples are discussed herein, any combination of examples and/or partial examples discussed herein may be combined to form further examples.

Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   obtaining, by a computer system, data representing an image derived from a microscopic scan of a physical location on a physical product instance, wherein the physical product instance is coupled to a tamper-resistant microchip including a microprocessor and a memory;
   storing the data representing the image in a database;
   generating an item material fingerprint digital certificate including the data representing the image or a hash of the data representing the image, wherein the item material fingerprint digital certificate is signed using a first private key of a first public/private key pair associated with a manufacturer of the physical product instance;
   obtaining, from a deoxyribonucleic acid (DNA) data authority, a DNA data authority certificate, wherein the DNA data authority certificate includes: a unique identifier of a person associated with the physical product instance, and a representation of a genomic sequence of the person associated with the physical product instance, and wherein the DNA data authority certificate is signed using a second private key of a second public/private key pair associated with the DNA data authority;
   generating a manufacturer product provenance certificate, wherein the manufacturer product provenance certificate includes data fields derived from the DNA data authority certificate; and
   storing the item material fingerprint digital certificate and the manufacturer product provenance certificate within the memory of the tamper-resistant microchip.

2. The computer-implemented method of claim 1, wherein the physical product instance is a designer good, and wherein the manufacturer produces a limited quantity of the designer good.

3. The computer-implemented method of claim 1, wherein the tamper-resistant microchip is embedded in the physical product instance.

4. The computer-implemented method of claim 1, wherein the data further represents a plurality of images derived from microscopic scans of a plurality of physical locations on the physical product instance.

5. The computer-implemented method of claim 1, wherein the database is managed by the manufacturer of the physical product instance.

6. The computer-implemented method of claim 1, further comprising obtaining, from the tamper-resistant microchip, the item material fingerprint digital certificate or the manufacturer product provenance certificate.

7. The computer-implemented method of claim 1, wherein the item material fingerprint digital certificate includes at least one of: a unique identifier of the physical product instance, an identifier of the manufacturer, or a key identifier of a public key assigned to the physical product instance.

8. The computer-implemented method of claim 1, wherein the tamper-resistant microchip includes a public/private key pair that is assigned to the tamper-resistant microchip, an internal certificate public/private key pair used to prove a cryptographic binding of other keys, a product instance key pair that is assigned to the physical product instance, and a public key associated with the manufacturer.

9. The computer-implemented method of claim 8, wherein the tamper-resistant microchip further includes a public key associated with a patron of the physical product instance.

10. The computer-implemented method of claim 1, further comprising storing, on a digital asset trading network, a digital asset token representing the physical product instance.

11. A non-transitory computer-readable medium having stored thereon instructions that, when executed by one or more processors, cause the one or more processors to perform operations including:
 obtaining, by a computer system, data representing an image derived from a microscopic scan of a physical location on a physical product instance, wherein the physical product instance is coupled to a tamper-resistant microchip including a microprocessor and a memory;
 storing the data representing the image in a database;
 generating an item material fingerprint digital certificate including the data representing the image or a hash of the data representing the image, wherein the item material fingerprint digital certificate is signed using a first private key of a first public/private key pair associated with a manufacturer of the physical product instance; and
 obtaining, from a deoxyribonucleic acid (DNA) data authority, a DNA data authority certificate, wherein the DNA data authority certificate includes: a unique identifier of a person associated with the physical product instance, and a representation of a genomic sequence of the person associated with the physical product instance, and wherein the DNA data authority certificate is signed using a second private key of a second public/private key pair associated with the DNA data authority;
 generating a manufacturer product provenance certificate, wherein the manufacturer product provenance certificate includes data fields derived from the DNA data authority certificate; and
 storing the item material fingerprint digital certificate and the manufacturer product provenance certificate within the memory of the tamper-resistant microchip.

12. The non-transitory computer-readable medium of claim 11, wherein the physical product instance is a designer good, and wherein the manufacturer produces a limited quantity of the designer good.

13. The non-transitory computer-readable medium of claim 11, wherein the tamper-resistant microchip is embedded in the physical product instance.

14. The non-transitory computer-readable medium of claim 11, wherein the data further represents a plurality of images derived from microscopic scans of a plurality of physical locations on the physical product instance.

15. The non-transitory computer-readable medium of claim 11, wherein the database is managed by the manufacturer of the physical product instance.

16. A computing device comprising:

a processor; and a non-transitory computer-readable medium having stored thereon instructions that, when executed by the processor, cause the processor to perform operations including:
 obtaining, by a computer system, data representing an image derived from a microscopic scan of a physical location on a physical product instance, wherein the physical product instance is coupled to a tamper-resistant microchip including a microprocessor and a memory;
 storing the data representing the image in a database;
 generating an item material fingerprint digital certificate including the data representing the image or a hash of the data representing the image, wherein the item material fingerprint digital certificate is signed using a first private key of a first public/private key pair associated with a manufacturer of the physical product instance;
 obtaining, from a deoxyribonucleic acid (DNA) data authority, a DNA data authority certificate, wherein the DNA data authority certificate includes: a unique identifier of a person associated with the physical product instance, and a representation of a genomic sequence of the person associated with the physical product instance, and wherein the DNA data authority certificate is signed using a second private key of a second public/private key pair associated with the DNA data authority;
 generating a manufacturer product provenance certificate, wherein the manufacturer product provenance certificate includes data fields derived from the DNA data authority certificate; and
 storing the item material fingerprint digital certificate and the manufacturer product provenance certificate within the memory of the tamper-resistant microchip.

17. The computing device of claim 16, wherein the physical product instance is a designer good, and wherein the manufacturer produces a limited quantity of the designer good.

18. The computing device of claim 16, wherein the tamper-resistant microchip is embedded in the physical product instance.

19. The computing device of claim 16, wherein the data further represents a plurality of images derived from microscopic scans of a plurality of physical locations on the physical product instance.

20. The computing device of claim 16, wherein the database is managed by the manufacturer of the physical product instance.

* * * * *